United States Patent
Miyamoto et al.

(10) Patent No.: US 10,348,133 B2
(45) Date of Patent: Jul. 9, 2019

(54) POWER TRANSMITTER AND WIRELESS POWER TRANSMISSION SYSTEM INCLUDING THE POWER TRANSMITTER

(71) Applicant: Panasonic Intellectual Property Management Co., Ltd., Osaka (JP)

(72) Inventors: Hideaki Miyamoto, Osaka (JP); Satoru Kikuchi, Osaka (JP); Tsutomu Sakata, Osaka (JP); Eiji Takahashi, Nara (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 51 days.

(21) Appl. No.: 15/865,975

(22) Filed: Jan. 9, 2018

(65) Prior Publication Data

US 2018/0205266 A1     Jul. 19, 2018

(30) Foreign Application Priority Data

Jan. 13, 2017   (JP) ................................ 2017-004108

(51) Int. Cl.
*H02J 7/00*       (2006.01)
*H02J 50/12*      (2016.01)
(Continued)

(52) U.S. Cl.
CPC .............. *H02J 50/12* (2016.02); *H02J 50/05* (2016.02); *H02J 50/10* (2016.02); *H02M 7/42* (2013.01)

(58) Field of Classification Search
CPC .................................................. H02J 50/05
(Continued)

(56) References Cited

U.S. PATENT DOCUMENTS

| 7,109,682 B2 * | 9/2006 | Takagi | .................. | H02J 7/0054 |
| | | | | 320/108 |
| 2011/0261931 A1 * | 10/2011 | Zimpfer | .................. | A61B 6/56 |
| | | | | 378/101 |

(Continued)

FOREIGN PATENT DOCUMENTS

| JP | 2004-096852 A | 3/2004 |
| JP | 2015-136274 A | 7/2015 |

OTHER PUBLICATIONS

Extended European Search Report for European Application No. 18150991.01, dated Mar. 9, 2018.

*Primary Examiner* — Yalkew Fantu
(74) *Attorney, Agent, or Firm* — Renner, Otto, Boisselle & Sklar, LLP

(57) ABSTRACT

A power transmitter wirelessly transmits electric power to a power receiver that includes a reception antenna. The power transmitter includes: an inverter circuit; a transmission antenna which sends out the AC power having been output from the inverter circuit; and a control circuit which, based on measurement values of voltage and current to be input to the inverter circuit, determines a value of a control parameter defining an output voltage from the inverter circuit and controls the inverter circuit by using the determined value of the control parameter. When at least one of the measurement values of voltage and current to be input to the inverter circuit changes, the control circuit changes the value of the control parameter based on the measurement values of voltage and current so that a voltage to be output from the power receiving circuit is maintained within a predetermined range.

13 Claims, 19 Drawing Sheets

(51) Int. Cl.
*H02M 7/42* (2006.01)
*H02J 50/05* (2016.01)
*H02J 50/10* (2016.01)

(58) Field of Classification Search
USPC .......................................................... 320/108
See application file for complete search history.

(56) References Cited

U.S. PATENT DOCUMENTS

| | | | |
|---|---|---|---|
| 2013/0187598 A1* | 7/2013 | Park | H02J 7/0042 320/108 |
| 2014/0159501 A1* | 6/2014 | Kanno | H01F 38/14 307/104 |
| 2014/0197694 A1* | 7/2014 | Asanuma | H01F 38/14 307/104 |
| 2015/0236518 A1* | 8/2015 | Matsumoto | H02J 7/025 307/104 |
| 2015/0340878 A1* | 11/2015 | Oosumi | H02J 50/10 307/104 |

* cited by examiner

POWER TRANSMITTER AND WIRELESS POWER TRANSMISSION SYSTEM INCLUDING THE POWER TRANSMITTER

BACKGROUND

1. Field of the Invention

The present disclosure relates to a power transmitter and to a wireless power transmission system including the power transmitter.

2. Description of the Related Art

Wireless power transmission techniques for wirelessly (i.e., contactlessly) transmitting electric power are available in various methods, including the electromagnetic induction method, the magnetic field resonance method, and the like.

Japanese Laid-Open Patent Publication No. 2015-136274 (hereinafter "Patent Document 1") discloses an example of a wireless power transmission system based on the magnetic field resonance method. Japanese Laid-Open Patent Publication No. 2004-096852 (hereinafter "Patent Document 2") discloses an example of a wireless power transmission system based on the electromagnetic induction method.

SUMMARY

In a conventional wireless power transmission technique, if the state of the load (e.g., impedance) changes during supply of electric power, stable supply of electric power may have been difficult to maintain in some cases.

The present disclosure provides a wireless power transmission technique which is able to realize a more stable operation even if the state of a load changes.

A power transmitter according to one implementation of the present disclosure wirelessly transmits electric power to a power receiver which includes a reception antenna. The power transmitter includes: an inverter circuit which converts input DC power into AC power and outputs the AC power; a transmission antenna which is connected to the inverter circuit, and which sends out the AC power having been output from the inverter circuit; and a control circuit which, based on measurement values of voltage and current to be input to the inverter circuit, determines a value of a control parameter defining an output voltage from the inverter circuit and controls the inverter circuit by using the determined value of the control parameter. When at least one of the measurement values of voltage and current to be input to the inverter circuit changes, the control circuit changes the value of the control parameter based on the measurement values of voltage and current so that a voltage to be output from the power receiving circuit is maintained within a predetermined range.

General and specific aspects of the present disclosure may be implemented using a system, a method, an integrated circuit, a computer program, or a storage medium, or any combination of a system, an apparatus, a method, an integrated circuit, a computer program, and/or a storage medium.

According to one implementation of the present disclosure, a more stable operation can be realized even if the state of the load changes.

DETAILED DESCRIPTION (Findings Providing the Basis of the Present Disclosure)

Prior to describing embodiments of the present disclosure, findings providing the basis of the present disclosure will be described.

Figure 1:
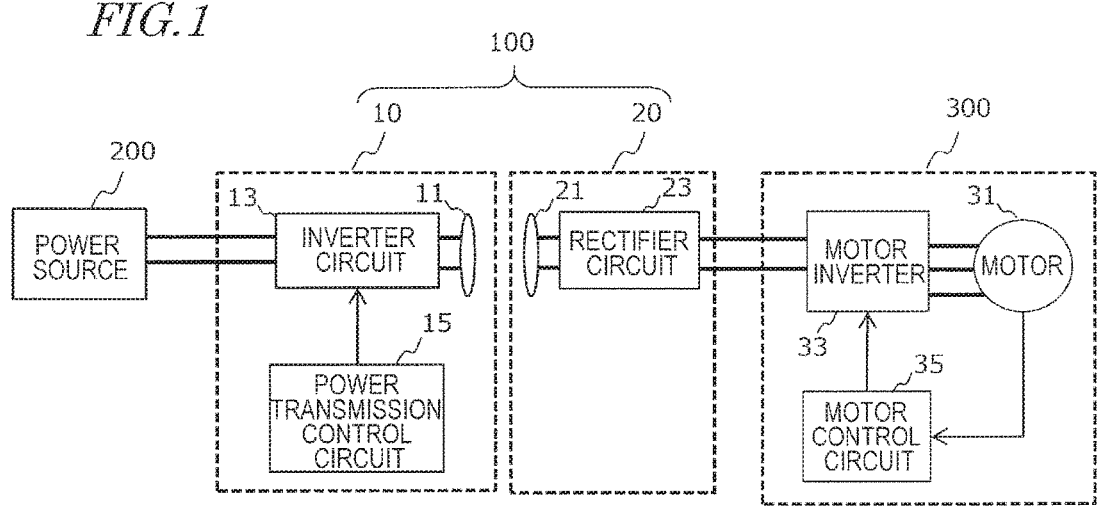
FIG. 1 is a block diagram showing an exemplary construction for a wireless power transmission system.

FIG. 1 is a block diagram showing an exemplary construction for a wireless power transmission system. This wireless power transmission system may be used for the purpose of, for example, supplying electric power to one or more loads (e.g., an electric motor(s)) in an industrial robot that is used at a factory, a site of engineering work, etc. Although the wireless power transmission system according to the present disclosure may also be used for other purposes (e.g., supplying power to electric vehicles such as electric automobiles), the present specification will mainly describe its applications to industrial robots.

The wireless power transmission system includes a power source 200, a wireless power feeding unit 100, and a load 300. The wireless power feeding unit 100 includes a power transmitter 10 and a power receiver 20. The load 300 in this example includes a motor 31, a motor inverter 33, and a motor control circuit 35. Without being limited to a device having the motor 31, the load 300 may be any device that operates with or utilizes electric power, e.g., a battery, a lighting device, or an image sensor. The load 300 may be a means of electrical storage, e.g., a secondary battery or a capacitor for electrical storage purposes, that stores electric power.

The power transmitter 10 includes a transmission antenna 11, an inverter circuit 13, and a power transmission control circuit 15. The inverter circuit 13, which is connected between the power source 200 and the transmission antenna 11, converts DC power that is output from the power source 200 into AC power, and outputs it. The transmission antenna 11, which may be a resonant circuit (i.e., a resonator) that includes a coil and a capacitor, for example, allows the AC power that has been output from the inverter circuit 13 to be sent out into space. The power transmission control circuit 15 may be an integrated circuit including a microcontroller unit (MCU) and a gate driver circuit, for example. The power transmission control circuit 15 switches the states of conduction/non-conduction of a plurality of switching elements that are included in the inverter circuit 13, thereby controlling the frequency and voltage of the AC power which is output from the inverter circuit 13.

The power receiver 20 includes a reception antenna 21 and a rectifier circuit 23. The reception antenna 21 may be a resonator that includes a coil and a capacitor, for example. The reception antenna 21 electromagnetically couples with the transmission antenna 11, and receives at least a portion of the electric power which has been transmitted from the transmission antenna 11. The rectifier circuit 23 converts the AC power which is output from the reception antenna 21 into DC power, and outputs it.

The load 300 includes the motor 31, the motor inverter 33, and the motor control circuit 35. Although the motor 31 in this example is a servo motor which is driven with a three-phase current, it may be any other kind of motor. The motor inverter 33 is a circuit that drives the motor 31, including a three-phase inverter circuit. The motor control circuit 35 is a circuit, e.g., an MCU, that controls the motor inverter 33. By switching the states of conduction/non-conduction of a plurality of switching elements that are included in the motor inverter 33, the motor control circuit 35 causes the motor inverter 33 to output a three-phase AC power as desired.

In such a wireless power transmission system, as the input voltage to the power transmitter 10 or the input current to the load 300 changes during power transmission, the output voltage from the power receiver 20 also changes. If a voltage that is applied to the load 300 exceeds a rated voltage of the load 300 due to fluctuations in the output voltage, the load 300 may malfunction, or be destroyed. Therefore, the output voltage from the power receiver 20 needs to be controlled so that no voltage that exceeds the rated voltage is applied to the load 300 (or preferably, so that a constant voltage is applied to the load 300). The input current to the load 300 depends on the operation status of the load 300. For example, in an application where the rotational speed of the motor 31 frequently changes, the current that flows into the motor inverter 33 also changes incessantly. As a result of this, the voltage which is output from the rectifier circuit 23 will also change frequently. In a construction where the power source 200 supplies electric power also to a device other than the power transmitter 10 (e.g., another load) in parallel, the input voltage to the inverter circuit 13 may change due to changes in the operation status of this other load.

Patent Document 1 discloses a system in which the output power of a power receiver is monitored; a request for power is made to a power transmitter via communications; and the power transmitter controls the transmission power based on this request. Patent Document 2 discloses controlling the duty ratio (i.e., a ratio of the ON period per cycle) of a switching element that is provided in a power transmitter in accordance with fluctuations in the input voltage, thus to maintain a constant transmission power.

However, when the technique of Patent Document 1 is adopted, where feedback control is made via communications, electric power control may take so much time that the load fluctuations cannot be followed. In particular, in the case of a load such as an industrial robot, whose operation status (e.g., the rotational speed(s) or torque(s) of a motor(s)) frequently changes, it is difficult to follow these changes. Although the technique of Patent Document 2 can address a situation where the input voltage to the power transmitter fluctuates, it cannot cope with any fluctuations in the output voltage that may occur due to fluctuations in the output current of the power receiver.

Based on the above thoughts, the inventors have arrived at a construction for solving the aforementioned problems. In outline, an embodiment of the present disclosure may be as follows.

A power transmitter according to one implementation of the present disclosure is a power transmitter to wirelessly transmit electric power to a power receiver that includes a reception antenna, the power transmitter comprising: an inverter circuit which converts input DC power into AC power and outputs the AC power; a transmission antenna which is connected to the inverter circuit, and which sends out the AC power having been output from the inverter circuit; and a control circuit which, based on measurement values of voltage and current to be input to the inverter circuit, determines a value of a control parameter defining an output voltage from the inverter circuit and controls the inverter circuit by using the determined value of the control parameter.

In accordance with the above implementation, based on measurement values of voltage and current to be input to the inverter circuit, the control circuit determines a value for a control parameter defining an output voltage from the inverter circuit, and controls the inverter circuit by using the determined value of the control parameter.

As a result, when the output voltage of the power receiver changes due to changes in the operation status of a load which is connected to the power receiver, for example, the control parameter can be swiftly adjusted to an appropriate value, thereby suppressing fluctuations in the voltage to be output from the power receiver. Similarly, when the input voltage to the inverter circuit has changed, too, the control parameter can be swiftly adjusted to an appropriate value, thereby suppressing fluctuations in the output voltage from the power receiver. As a result, problems such as malfunctioning or destruction of the load can be avoided.

In one embodiment, when at least one of the measurement values of voltage and current to be input to the inverter circuit changes, the control circuit changes the value of the control parameter based on the measurement values of voltage and current so that a voltage to be output from the power receiving circuit is maintained within a predetermined range (e.g., at a constant value).

As a result, when the operation status of the load has changed, for example, a voltage which is within the predetermined range is always supplied to the load. Thus, the load is allowed to operate more safely and stably.

The power transmitter may further comprise a memory (storage medium) storing correlation data representing correspondence between values of voltage and current to be input to the inverter circuit and values of the control parameter. In that case, by referring to the correlation data, the control circuit is able to immediately determine a value of the control parameter from the measurement values of voltage and current to be input to the inverter circuit. Such correlation data may be stored in the memory in various forms, such as a look-up table or a mathematical function, for example. Correlation data may be recorded in a ROM within the power transmitter in advance, or acquired from an external device via communications.

In the present specification, a "control parameter" is a parameter which determines the value (i.e., level) of voltage which is output from the inverter circuit or voltage which is output from the power receiver. The control parameter may be, for example, the frequency of AC power which is output from the inverter circuit (hereinafter referred also to as the "drive frequency"), the duty ratio of a pulse signal (also referred to as a "control signal") which is supplied to each of a plurality of switching elements that are included in the inverter circuit, or the like. When the inverter circuit is a full bridge inverter, the control parameter may be a phase difference (also referred to as a "phase shift amount") between pulse signals which are supplied to two switching elements that are simultaneously made conducting (ON). Otherwise, in an implementation where a DC-DC converter is connected in front of the inverter circuit, it may be a step-up ratio, a step-down ratio, or other parameters of the DC-DC converter.

The wireless power transmission system in the example shown in FIG. 1 includes one wireless power feeding unit 100 and one load 300. However, the wireless power transmission system according to the present disclosure is not limited to any such implementation. The wireless power transmission system may include a plurality of wireless power feeding units that are connected in series. Respectively different loads may be connected to the plurality of wireless power feeding units. Hereinafter, an example of such construction will be briefly described.

Figure 2:
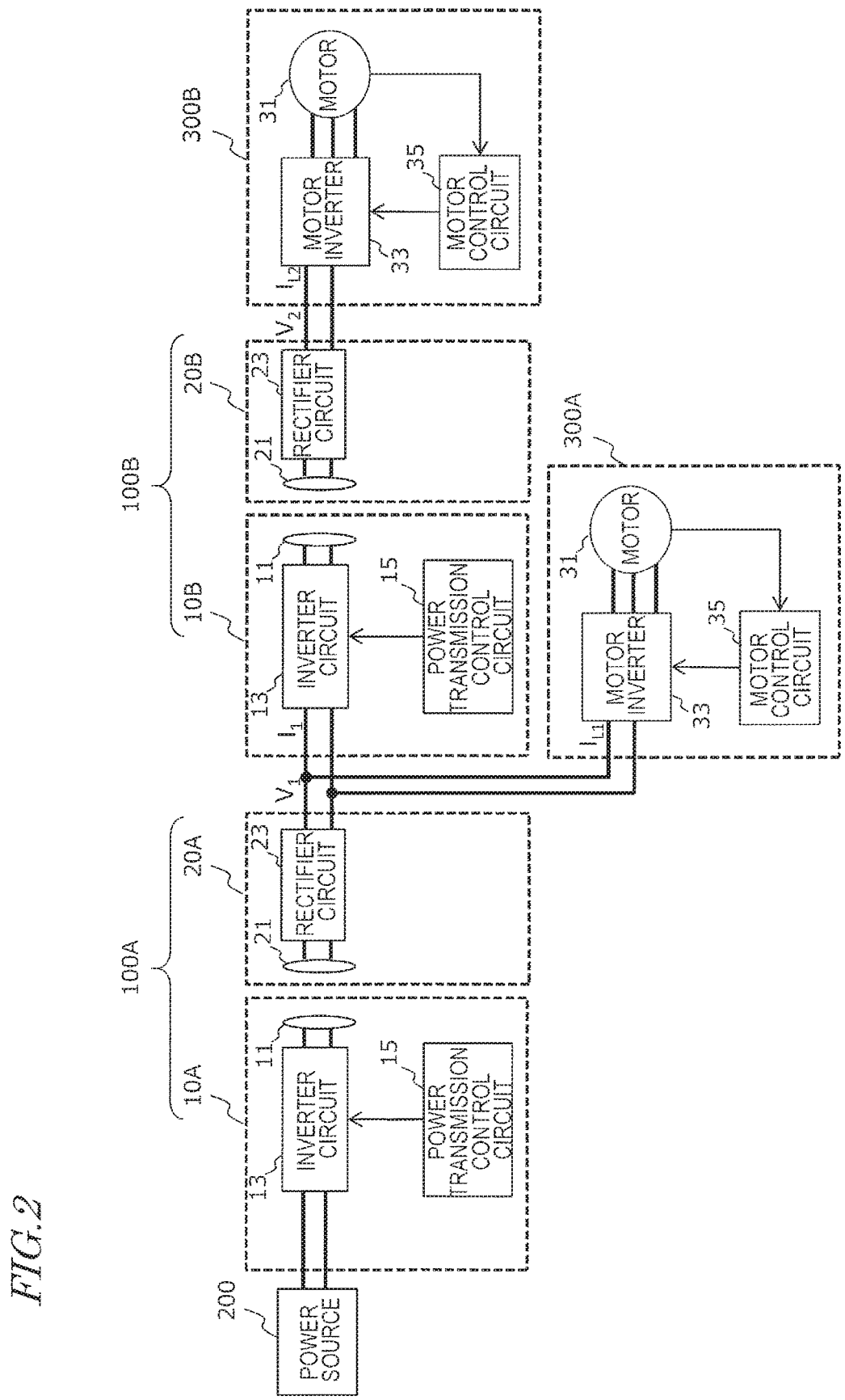
FIG. 2 is a block diagram showing another exemplary construction for a wireless power transmission system.

FIG. 2 is a block diagram showing another exemplary construction for a wireless power transmission system. This wireless power transmission system includes a first wireless power feeding unit 100A, a second wireless power feeding unit 100B, a first load 300A, and a second load 300B. The first wireless power feeding unit 100A includes a first power transmitter 10A and a first power receiver 20A. The second wireless power feeding unit 100B includes a second power transmitter 10B and a second power receiver 20B. Each power transmitter 10A, 10B includes the same constituent elements as does the aforementioned power transmitter 10. Each power receiver 20A, 20B includes the same constituent elements as does the aforementioned power receiver 20. In this example, the first power transmitter 10A is connected to the power source 200. The second power transmitter 10B and the first load 300A are connected to the first power receiver 20A. The second load 300B is connected to the second power receiver 20B. More specifically, the inverter circuit 13 of the first power transmitter 10A is connected to the power source 200. The inverter circuit 13 of the second power transmitter 10B and the motor inverter 33 of the first load 300A are connected to the rectifier circuit 23 of the first power receiver 20A. The motor inverter 33 of the second load 300B is connected to the rectifier circuit 23 of the second power receiver 20B.

The first power transmitter 10A receives DC power from the power source 200 in a wired manner, converts the DC power into AC power, and outputs it. The first power receiver 20A receives the AC power which has been wirelessly transmitted from the first power transmitter 10A, converts the AC power into DC power, and outputs it. The second power transmitter 10B and the first load 300A receive in a wired manner the DC power which is output from the first power receiver 20A, so as to be driven with this DC power. The second power receiver 20B wirelessly receives AC power which has been transmitted from the second power transmitter 10B, converts the AC power into DC power, and outputs it. The second load 300B receives the DC power which is output from the second power receiver 20B, so as to be driven with this electric power.

In this example, there are two wireless power feeding units 100A and 100B; alternatively, three or more wireless power feeding units may be connected in series. A construction where two or more loads are connected in parallel to one wireless power feeding unit may also be possible. Each load may also include any electric device other than a motor (e.g., a camera or a light source) or a means of electrical storage. In the example shown in the figure, DC power is supplied to the power transmitters 10A and 10B, whereas the power receivers 20A and 20B output DC power; however, this implementation is not a limitation. For example, each power receiver 20A, 20B may not include the rectifier circuit 23, and instead, the subsequent power transmitter 10B or the load 300A or 300B may include a rectifier circuit. Furthermore, instead of providing a rectifier circuit, a frequency conversion circuit which performs AC-AC conversion (e.g., a matrix converter) may be used. Such a frequency conversion circuit may be provided in each power receiver, or in each power transmitter or load.

With such a construction, the electric power which is output from the power source 200 is sequentially supplied to the plurality of loads 300A and 300B, via the wireless power feeding units 100A and 100B. Such a system is suitable for an apparatus such as a robot arm apparatus, where a multitude of actuators are driven altogether. Providing a wireless power feeding unit in a joint or an expandable section of a robot allows cables for supplying power to be omitted from that place, thereby providing an advantage of enhanced safety and movability.

According to a study by the inventors, in a wireless power transmission system as shown in FIG. 2, simultaneously-occurring changes in the states of the first load 300A and the second load 300B (e.g., the rotational speeds of the motors) cannot be dealt with by conventional techniques. When the states of the loads 300A and 300B have simultaneously changed, transient fluctuations in the output voltage from the power receiver 20B will be aggravated. This problematically makes it difficult for the output voltage to fit within the range input rated voltage of the second load 300B.

Figure 3A:
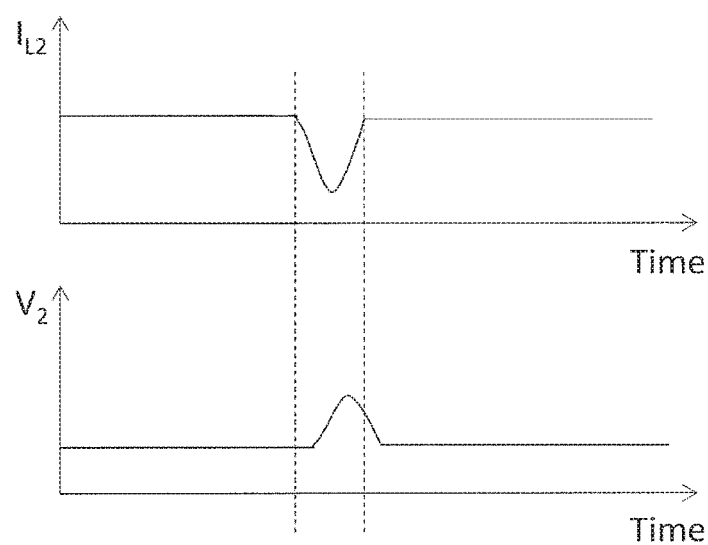
FIG. 3A is a diagram showing an example change over time of an input current $I_{L2}$ and an input voltage $V_2$ to a second load 300B in the case where only the state of a second load 300B changes.
Figure 3B:
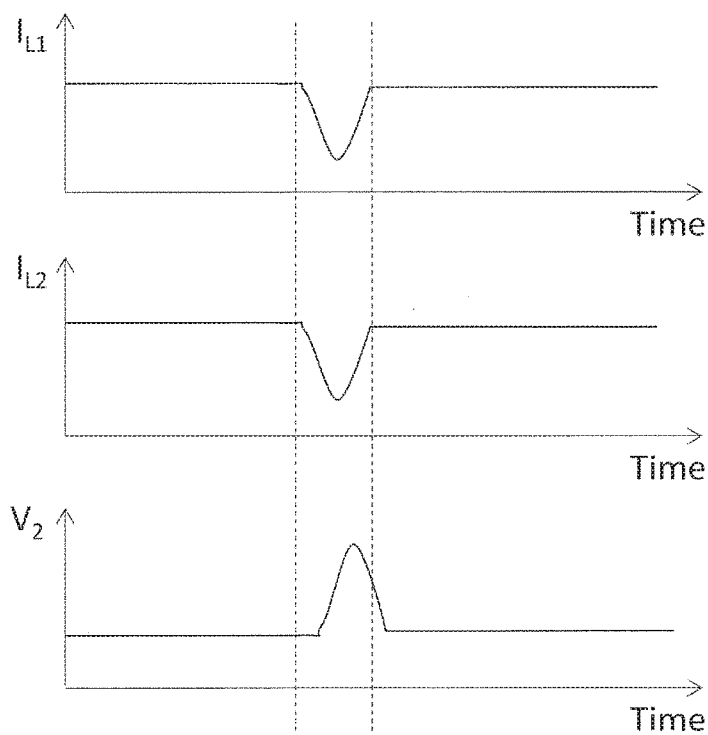
FIG. 3B is a diagram showing an example change over time of an input current $I_{L1}$ to a first load 300A, an input current $I_{L2}$ to a second load 300B, and an input voltage $V_2$ to the second load 300B, in the case where the states of both of the first load 300A and the second load 300B change simultaneously.

FIG. 3A and FIG. 3B are diagrams for illustrating this problem. FIG. 3A shows an example change over time of an input current $I_{L2}$ and an input voltage $V_2$ to the second load 300B in the case where only the state of the second load 300B changes. FIG. 3B shows an example change over time of an input current $I_{L1}$ to the first load 300A, an input current $I_{L2}$ to the second load 300B, and an input voltage $V_2$ to the second load 300B in the case where the states of both of the first load 300A and the second load 300B change simultaneously.

In the example shown in FIG. 3A, the input current $I_{L2}$ to the load 300B fluctuates with a fluctuation in the state of the load 300B, thus causing a change in the input voltage $V_2$ to the load 300B. Since only the load 300B is fluctuating, the amount of change of voltage $V_2$ is limited. However, in the example shown in FIG. 3B, not only the input current $I_{L1}$ to the load 300B but also the input current $I_{L2}$ to the load 300A is simultaneously fluctuating. Thus, owing to the fluctuation in both currents $I_{L1}$ and $I_{L2}$, a large fluctuation is caused in the voltage $V_2$. For example, let it be assumed that the voltage $V_2$ increases by 20% (i.e., to become 1.2 times greater) due to a fluctuation in the load 300A, and that the voltage $V_2$ increases by 30% (i.e., to become 1.3 times greater) due to a fluctuation in the load 300B. In this case, the fluctuations in both loads 300A and 300B will cause a 56% increase in the voltage $V_2$ (i.e., to become 1.56 times greater). Such a large transient fluctuation will be difficult to cope with by methods such as the conventional feedback control.

Therefore, in one embodiment of the present disclosure, in determining the value of the control parameter, the control circuit of each power transmitter relies not only on measurement values of voltage and current to be input to the inverter circuit, but also on measurement values of voltage and current to be output from the first power receiver, or measurement values of voltage and current to be input to the first load. By utilizing not only information of input power to the power transmitter, but also information of output power from the preceding power receiver, or input power to a load that is connected in parallel to that power transmitter, it is possible to suppress fluctuations in the output voltage from the second power receiver, even if the first load and the second load fluctuate simultaneously, as will be described below.

Hereinafter, more specific embodiments of the present disclosure will be described. Note however that unnecessarily detailed descriptions may be omitted. For example, detailed descriptions on what is well known in the art or redundant descriptions on what is substantially the same construction may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, identical or similar constituent elements are denoted by identical reference numerals.

Embodiment 1

Figure 4:
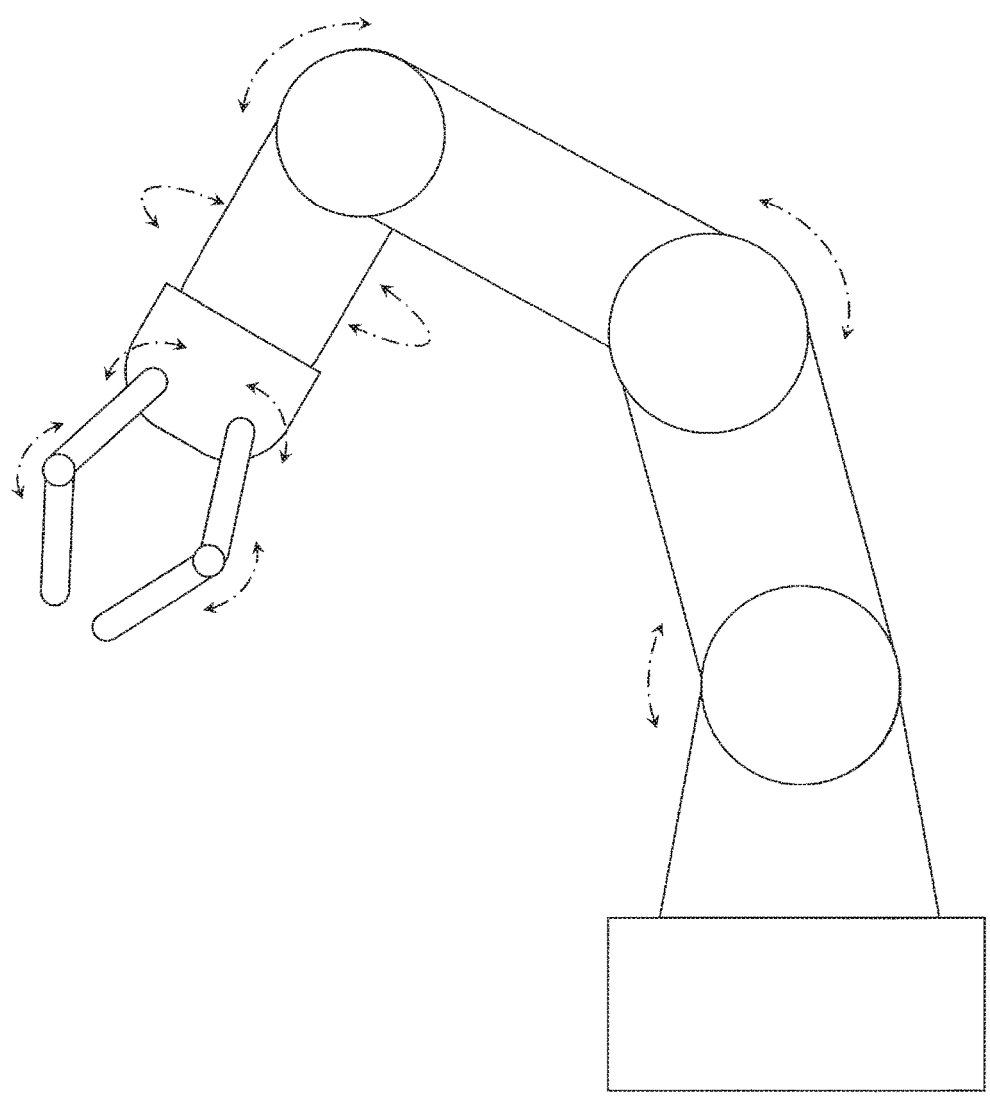
FIG. 4 is a diagram schematically showing an example of a robot arm apparatus in which a wireless power transmission system according to Embodiment 1 of the present disclosure is applied.

FIG. 4 is a diagram schematically showing an example of a robot arm apparatus in which a wireless power transmission system according to the present embodiment is applied. This robot arm apparatus includes a plurality of movable sections (e.g., joints and linear motion sections). Each movable section is constructed so as to be capable of rotation or expansion/contraction by means of an actuator that includes an electric motor. In order to control such an apparatus, it is necessary to individually supply electric power to the plurality of motors and control them. Supply of power from a power source to the plurality of motors has conventionally been achieved via a multitude of cables. However, in a construction where cables are used for supplying power, as many cables as there are motors need to be provided. This causes accidents due to snagging of cables, which leads to the problems of limited ranges of motion and difficulty in changing parts. Moreover, repetitive bending of cables may deteriorate the cables, or even disrupt them. Therefore, in the present embodiment, a wireless power transmission technique is adopted in at least one movable section, thereby reducing the cables in the movable section(s).

Figure 5:
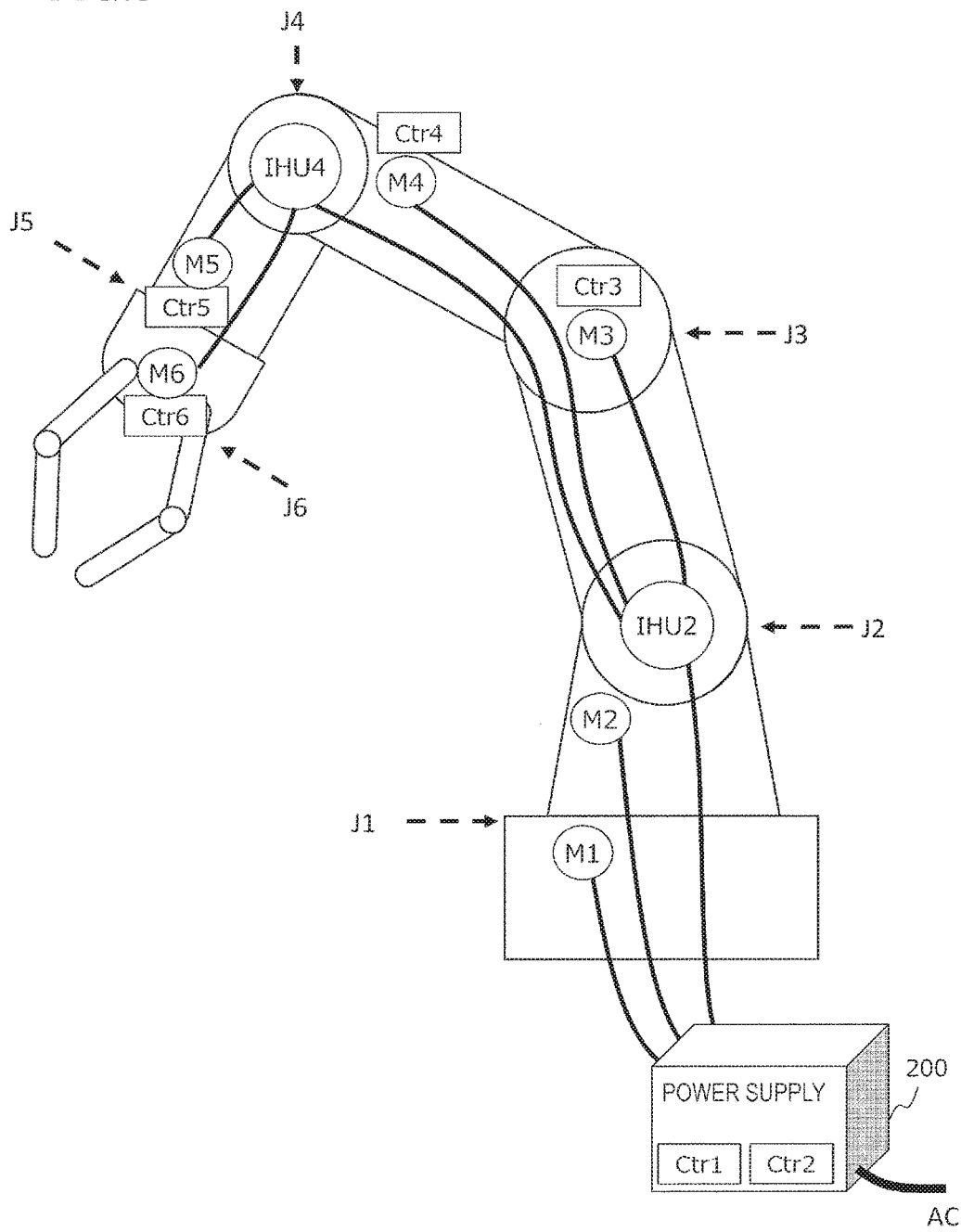
FIG. 5 is a diagram showing an exemplary construction for a robot arm apparatus.

FIG. 5 is a diagram showing an example construction of a robot arm apparatus in which the above-described wireless power transmission is applied. This robot arm apparatus has joints J1 to J6. Among these, the above-described wireless power transmission is applied to the joints J2 and J4. On the other hand, conventional wired power transmission is applied to the joints J1, J3, J5, and J6. The robot arm apparatus includes: a plurality of motors M1 to M6 which respectively drive the joints J1 to J6; motor control circuits Ctr3 to Ctr6 which respectively control the motors M3 to M6 among the motors M1 to M6; and two wireless power feeding units (intelligent robot harness units; also referred to as IHUs) IHU2 and IHU4 which are respectively provided in the joints J2 and J4. Motor control circuits Ctr1 and Ctr2 which respectively drive the motors M1 and M2 are provided in a power supply 200 which is external to the robot.

The power supply 200 supplies electric power to the motors M1 and M2 and the wireless power feeding unit IHU2 in a wired manner. At the joint J2, the wireless power feeding unit IHU2 wirelessly transmits electric power via a pair of coils. The transmitted electric power is then supplied to the motors M3 and M4, the control circuits Ctr3 and Ctr4, and the wireless power feeding unit IHU4. The wireless power feeding unit IHU4 also wirelessly transmits electric power via a pair of coils in the joint J4. The transmitted electric power is supplied to the motors M5 and M6 and the control circuits Ctr5 and Ctr6. With such construction, cables for power transmission can be eliminated in the joints J2 and J4.

Figure 6:
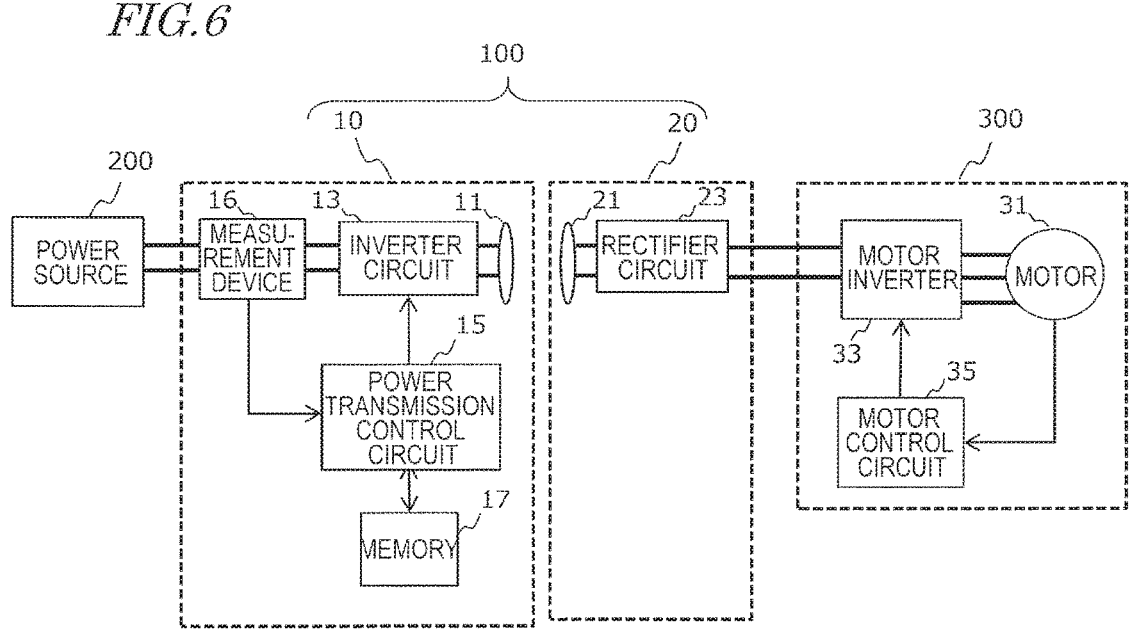
FIG. 6 is a block diagram showing a partial construction of the wireless power transmission system according to Embodiment 1.

FIG. 6 is a block diagram showing a partial construction of the wireless power transmission system according to the present embodiment. A wireless power feeding unit 100 shown in FIG. 6 corresponds to the wireless power feeding unit IHU2 shown in FIG. 5, and a load 300 corresponds to a circuit that includes the motor M3 and the motor control circuit Ctr3. For simplicity, elements corresponding to the motor M4, the motor control circuit Ctr4, the wireless power feeding unit IHU4, and the like in FIG. 5 are omitted from illustration in FIG. 6. In addition to the load 300, other loads (including the motor M4 or the like) and another wireless power feeding unit IHU4 may also be connected in parallel to the rectifier circuit 23 of the power receiver 20.

The wireless power transmission system of the present embodiment has a fundamental construction similar to that shown in FIG. 1. However, in the present embodiment, a measurement device 16 to measure current and voltage is provided between the power source 200 and the inverter circuit 13. Furthermore, the power transmitter 10 includes a memory 17 which stores correlation data defining a correspondence between the input current and input voltage to the inverter circuit 13 and the control parameter of the inverter circuit 13. Based on the information of current and voltage (or electric power) as measured by the measurement device 16 and on the correlation data stored in the memory 17, the power transmission control circuit 15 determines an optimum value for the control parameter to the inverter circuit 13. As a result, even if the state of the load 300 changes, the input voltage to the load 300 can be maintained constant.

Similar constructions to that of FIG. 6 are also applicable to the wireless power feeding unit IHU4 and the subsequent loads shown in FIG. 5. Rather than from the power source 200, the wireless power feeding unit IHU4 receives DC power that is supplied from the wireless power feeding unit IHU2.

Hereinafter, the construction of the respective constituent elements in the present embodiment will be described.

Figure 7A:
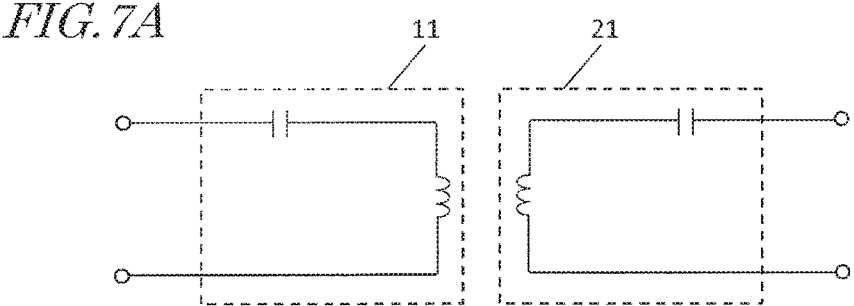
FIG. 7A is a diagram showing an exemplary equivalent circuit for a transmission antenna 11 and a reception antenna 21 in a wireless power feeding unit 100.

FIG. 7A is a diagram showing an exemplary equivalent circuit for the transmission antenna 11 and the reception antenna 21 in the wireless power feeding unit 100. As shown in the figure, each antenna is a resonant circuit having a coil (inductance component) and a capacitor (capacitance component). By ensuring that the resonant frequencies of two coils opposing each other have close values, electric power can be transmitted with a high efficiency. The transmission coil receives AC power supplied from the inverter circuit 13. Owing to a magnetic field that is generated with this AC power from the transmission coil, electric power is transmitted to the reception coil. In this example, the transmission antenna 11 and the reception antenna 21 both function as series resonant circuits.

Figure 7B:
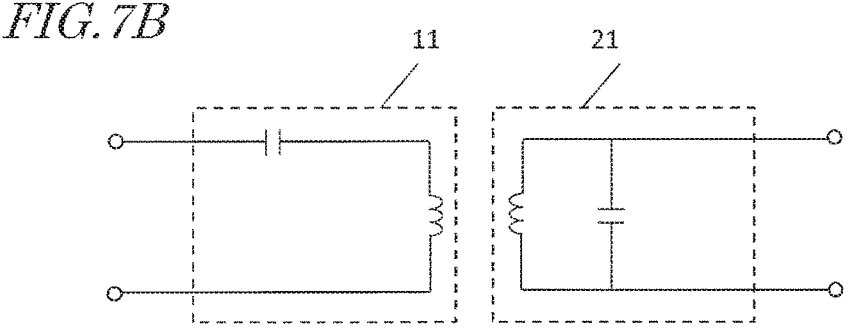
FIG. 7B is a diagram showing another exemplary equivalent circuit for a transmission antenna 11 and a reception antenna 21 in the wireless power feeding unit 100.

FIG. 7B is a diagram showing another exemplary equivalent circuit for the transmission antenna 11 and the reception antenna 21 in the wireless power feeding unit 100. In this example, the transmission antenna 11 functions as a series resonant circuit, whereas the reception antenna 21 functions as a parallel resonant circuit. In another possible implementation, the transmission antenna 11 may constitute a parallel resonant circuit.

Although the present embodiment adopts a transmission antenna and a reception antenna based on resonant circuits, an electromagnetic induction method (which does not utilize resonance) or a power transmission method (which utilizes microwaves) may alternatively be adopted. Moreover, a wireless power transmission based on the electric field coupling method may also be adopted. In the electric field coupling method, electric power is transmitted via electric field coupling between a pair of electrodes, rather than between a pair of coils.

Each coil may be, for example, a planar coil or a laminated coil that is formed on a circuit board, or a wound coil of a copper wire, a litz wire, a twisted wire, or the like. The capacitance component in each resonant circuit may be realized by the parasitic capacitance of the coil, or alternatively a capacitor of a chip shape or a lead shape may be additionally provided, for example.

Typically, the resonant frequency f0 of the resonant circuit is set equal to the transmission frequency f that exists during power transmission. The resonant frequency f0 of each resonant circuit may not be exactly equal to the transmission frequency f. Each resonant frequency f0 may be set to a value in the range of about 50% to 150% of the transmission frequency f, for example. The frequency f of power transmission may be set to e.g. 50 Hz to 300 GHz, more preferably 20 kHz to 10 GHz, still more preferably 20 kHz to 20 MHz, and still more preferably 20 kHz to 7 MHz. Within any such frequency band, a frequency of drive power and a frequency of control power may be selected. The frequency of drive power and the frequency of control power may be set to different values.

The inverter circuit 13 converts DC power which is input from the power source 200 into AC power. The inverter circuit 13 may have a circuit construction of a full bridge inverter or a half bridge inverter, for example. The inverter circuit 13 includes a plurality of switching elements, such that the conducting (ON)/non-conducting (OFF) state of each switching element is controlled by the control circuit 15.

The rectifier circuit 23 may be a rectifier including a diode bridge and a smoothing capacitor, as shown in 7C, for example. The power receiver 20 may include various circuits, such as constant voltage/constant current control circuitry, and/or modulation/demodulation circuitry for communication purposes.

The power transmission control circuit 15 can be implemented as a combination of a control circuit including a processor and a memory, e.g., a microcontroller unit (MCU), and a gate driver circuit. By executing a computer program which is stored in the memory 17, the power transmission control circuit 15 is able to perform various controls. Note that the memory 17 may be internalized in the power transmission control circuit 15. The power transmission control circuit 15 may be implemented in special-purpose hardware that is adapted to perform the operation according to the present embodiment.

In accordance with a predetermined control program that is stored in a storage medium, e.g., a memory, the power transmission control circuit 15 according to the present embodiment controls the inverter circuit 13. In doing so, based on the input current and input voltage (or input power) to the inverter circuit 13 as detected by the measurement device 16, the power transmission control circuit 15 determines a level of voltage to be output from the inverter circuit 13. More specifically, by referring to the correlation data (e.g., a look-up table or a mathematical function) that is stored in the memory 17, the power transmission control circuit 15 determines a value for the control parameter of the inverter circuit 13 that corresponds to a given combination of values of input current and input voltage.

The "control parameter" is a parameter that determines a level of voltage to be output from the inverter circuit 13. The control parameter may be, for example, the frequency of pulse signals (e.g., PWM pulse signals) to be supplied to the plurality of switching elements in the inverter circuit 13, a phase shift amount between two pulse signals to be supplied to two switching elements in a full bridge inverter that are simultaneously turned ON, or a duty ratio of a pulse signal to be supplied to each of the plurality of switching elements. Although not shown in FIG. 6, in one implementation, a DC-DC converter may be provided in front of the inverter circuit 13. In that case, the power transmission control circuit 15 may control the DC-DC converter to vary the voltage level of the DC power to be input to the inverter circuit 13. In such an implementation, the value of the output voltage from the DC-DC converter may be utilized as the control parameter. By varying the frequency of switching by the switching elements in the DC-DC converter, the control circuit 15 is able to adjust the level of voltage to be output from the DC-DC converter. By varying the control parameter as such, it is possible to change the voltage level of the AC power to be output from the inverter circuit 13, and change the amplitude of the AC power to be received by the power receiver 20.

Figure 8A:
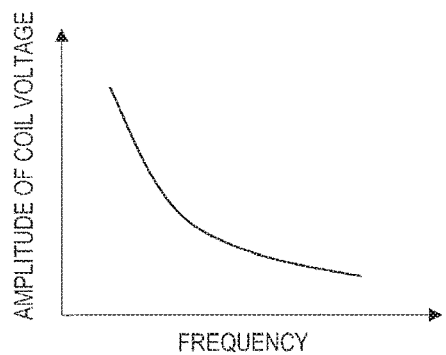
FIG. 8A is a diagram illustrating a tendency that the amplitude of a voltage across both ends of a coil decreases as frequency is increased.
Figure 8B:
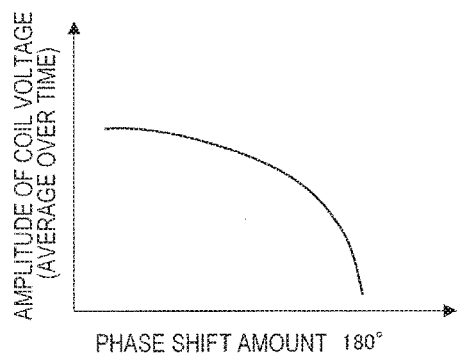
FIG. 8B is a diagram illustrating a tendency that an average over time of the amplitude of a voltage across both ends of a coil decreases as the phase shift amount is increased within a range from 0° to 180°.
Figure 8C:
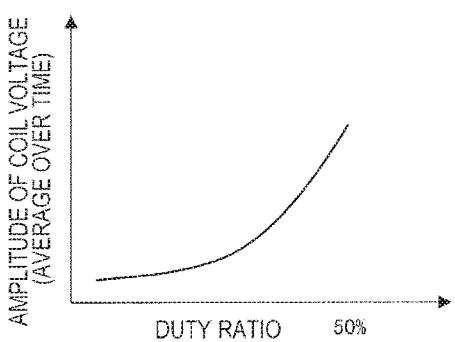
FIG. 8C is a diagram illustrating a tendency that an average over time of the amplitude of a voltage across both ends of a coil increases as the duty ratio is increased within a range from 0% to 50%.
Figure 8D:
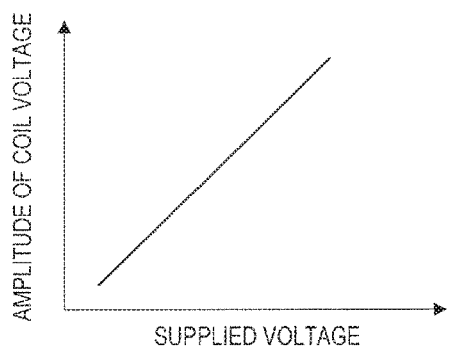
FIG. 8D is a diagram illustrating a tendency that the amplitude of a voltage across both ends of a coil increases as the voltage which is supplied to an inverter circuit 13 is increased.

FIGS. 8A, 8B, 8C, and 8D schematically show examples of dependence of the amplitude of a voltage across both ends of a coil of the transmission antenna 11, respectively on the frequency, phase shift amount, duty ratio, and supplied voltage to the inverter circuit 13. FIG. 8A illustrates a tendency that the amplitude of a voltage across both ends of a coil decreases as frequency is increased. However, in a low frequency region, there is a reverse tendency that the amplitude of the voltage decreases as frequency is decreased. FIG. 8B illustrates a tendency that an average over time of the amplitude of a voltage across both ends of a coil decreases as the phase shift amount is increased within a range from 0° to 180°. FIG. 8C illustrates a tendency that an average over time of the amplitude of a voltage across both ends of a coil increases as the duty ratio is increased within a range from 0% to 50%. FIG. 8D illustrates a tendency that the amplitude of a voltage across both ends of a coil increases as the voltage which is supplied to the inverter circuit 13 is increased. By utilizing at least one of the frequency, phase shift amount, duty ratio, and supplied voltage to the inverter circuit 13 as the control parameter, the control circuit 15 is able to control the amplitude of a voltage across both ends of the transmission antenna 11 or a time average value thereof.

Figure 9:
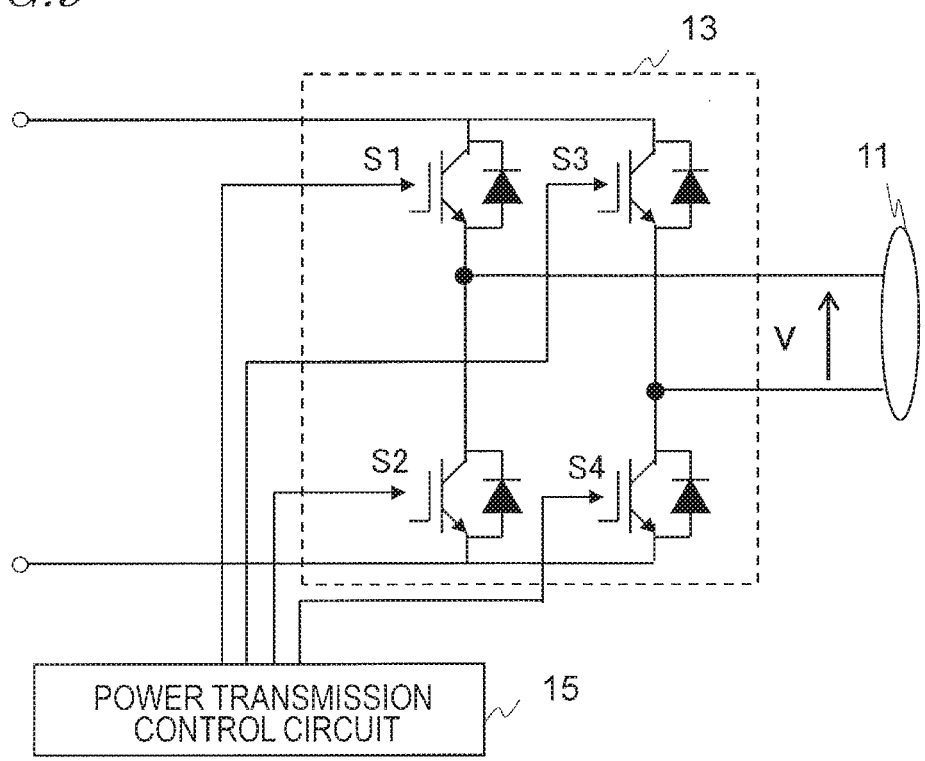
FIG. 9 is a diagram showing an exemplary construction for the inverter circuit 13.

FIG. 9 is a diagram showing an exemplary construction for the inverter circuit 13. The inverter circuit 13 includes a plurality of switching elements S1 to S4, each of which switches its state conduction/non-conduction in accordance with a pulse signal that is supplied from the power transmission control circuit 15. Through changes in the states of conduction/non-conduction of the respective switching elements, input DC power can be converted into AC power. In the example shown in FIG. 9, a full bridge inverter circuit having four switching elements S1 to S4 is used. In this example, each switching element is an IGBT (Insulated-gate bipolar transistor); alternatively, other types of switching elements, e.g., MOSFETs (Metal Oxide Semiconductor Field-Effect Transistors), may also be used.

In the example shown in FIG. 9, among the four switching elements S1 to S4, the switching elements S1 and S4 (first switching element pair), in their conducting state, allows a voltage of the same polarity as the DC voltage that is input to the inverter circuit 13 to be supplied to the transmission antenna 11. On the other hand, the switching elements S2 and S3 (second switching element pair), in their conducting state, allows a voltage of the opposite polarity from the DC voltage that is input to the inverter circuit 13 to be supplied to the transmission antenna 11. The power transmission control circuit 15 supplies pulse signals to the gates of the four switching elements S1 to S4. At this time, amplitude control can be effected through adjustment of the phase difference between two pulse signals that are supplied to the first switching element pair (S1 and S4) and the phase difference between two pulse signals that are supplied to the second switching element pair (S2 and S3).

Figure 10A:
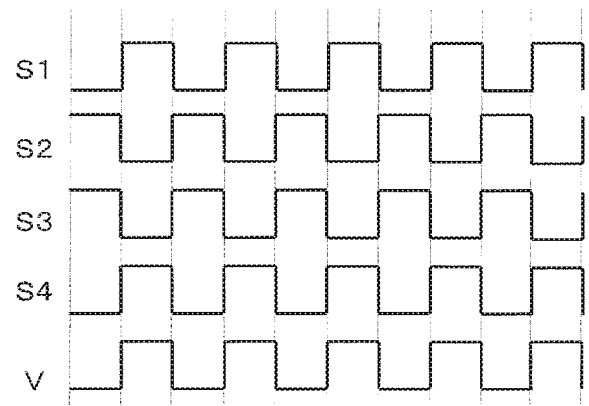
FIG. 10A is a diagram schematically showing, in the case where a phase shift amount φ between two pulse signals that are supplied to switching elements S1 and S4 and between two pulse signals that are supplied to switching elements S2 and S3 is 0 degrees, change over time of the four pulse signals and a voltage V which is output from the inverter circuit 13.
Figure 10B:
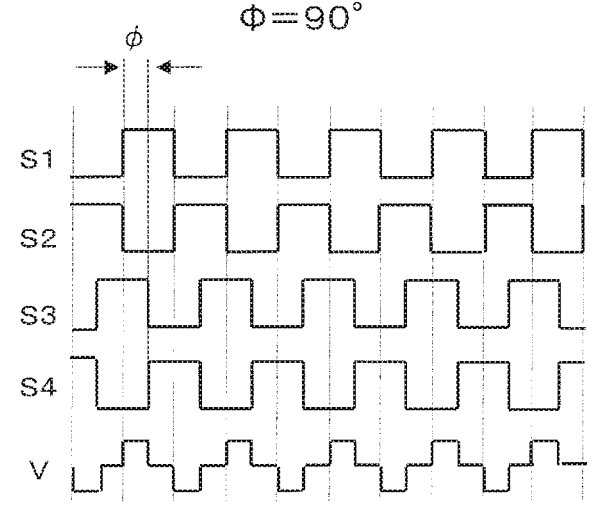
FIG. 10B is a diagram schematically showing, in the case where the phase shift amount φ is 90 degrees, change over time of the pulse signals and the voltage V.

FIGS. 10A and 10B are diagrams for illustrating amplitude control based on a phase difference between pulse signals. FIG. 10A schematically shows, in the case where a phase shift amount φ between two pulse signals that are supplied to the switching elements S1 and S4 and between two pulse signals that are supplied to the switching elements S2 and S3 is 0 degrees, change over time of the four pulse signals and the voltage V which is output from the inverter circuit 13. FIG. 10B schematically shows, in the case where the phase shift amount φ is 90 degrees, change over time of the pulse signals and the voltage V. The phase shift amount φ is adjusted by introducing a shift in time between the rise and fall timing of the pulse signals that are input to the switching elements S1 and S2 and the fall and rise timing of the pulse signals that are input to the switching elements S3 and S4. As the phase shift amount φ is varied, the output time rate (i.e., a proportion that a non-zero value period accounts for within 1 cycle) of the voltage V changes. As the phase shift amount φ becomes closer to 0 degrees, the output time rate of the voltage V increases; as the phase shift amount φ becomes closer to 180 degrees, the output time rate of the voltage V decreases. The voltage V which is output from the inverter circuit 13 may be converted into a sine voltage by a smoothing circuit not shown, and thereafter supplied to the transmission antenna 11. The amplitude of the sine voltage changes in accordance with the output time rate. Therefore, by varying the phase shift amount φ, a time average value of the amplitude of the AC voltage which is input to the transmission antenna 11 can be changed.

Figure 11:
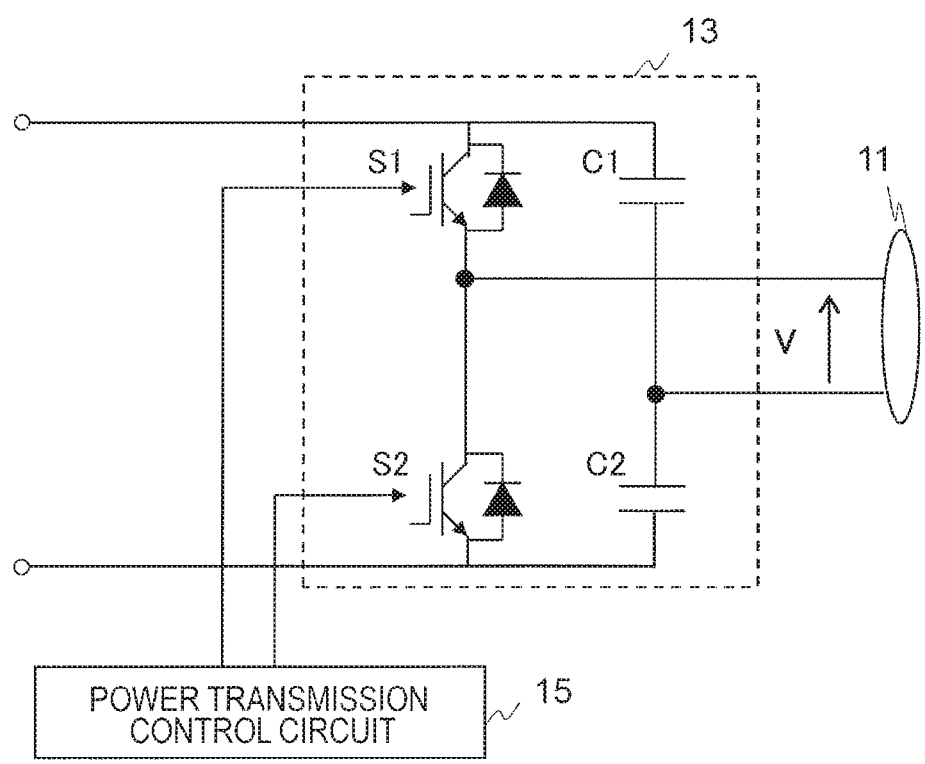
FIG. 11 is a diagram showing another exemplary construction for the inverter circuit 13.

FIG. 11 is a diagram showing another exemplary construction for the inverter circuit 13. The inverter circuit 13 in this example is a half bridge inverter circuit. The aforementioned phase control is not applicable to a half bridge inverter circuit; therefore, in this case, the duty ratio of a pulse signal to be input to each switching element is controlled in order to control a time average value of the amplitude of voltage.

The inverter circuit 13 shown in FIG. 11 is a half bridge inverter circuit including two switching elements S1 and S2 and two capacitors. The two switching elements S1 and S2 and the two capacitors C1 and C2 are connected in parallel. One end of the transmission antenna 11 is connected at a node between the two switching elements S1 and S2, whereas another end is connected at a node between the two capacitors C1 and C2.

The control circuit 15 supplies pulse signals to the respective switching elements such that the switching elements S1 and S2 are alternately turned ON. As a result of this, DC power is converted into AC power.

In this example, by adjusting the duty ratio (a proportion that an ON period accounts for within 1 cycle) of the pulse signals, the output time rate of the output voltage V can be adjusted. Through this, the AC power to be input to the transmission antenna 11 can be adjusted.

Figure 12A:
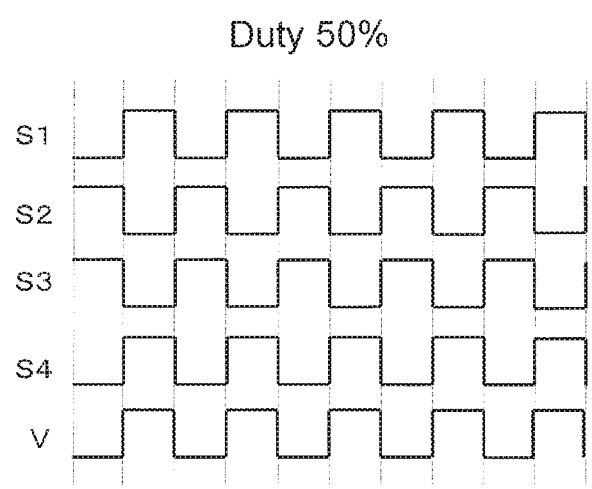
FIG. 12A is a diagram showing exemplary waveforms of the pulse signals that are input to the switching elements S1 to S4 and the output voltage V, in the case where each pulse signal has a duty ratio of 0.5 (50%).
Figure 12B:
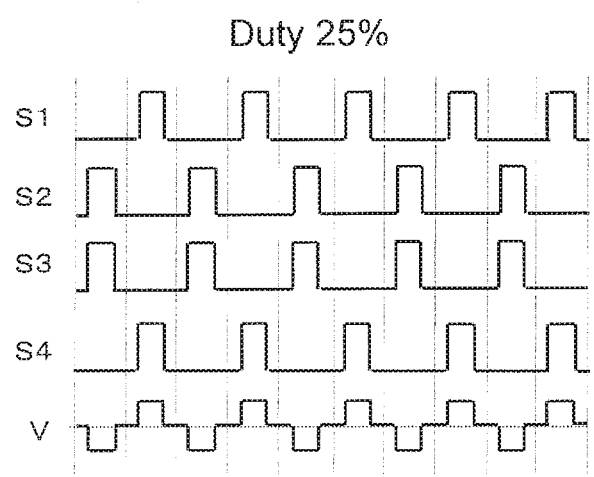
FIG. 12B is a diagram showing exemplary waveforms of the pulse signals that are input to the switching elements S1 to S4 and the output voltage V, in the case where each pulse signal has a duty ratio of 0.25 (25%).

FIGS. 12A and 12B are diagrams for illustrating duty control. FIG. 12A is a diagram showing exemplary waveforms of the pulse signals that are input to the switching elements S1 to S4 and the output voltage V, in the case where each pulse signal has a duty ratio of 0.5 (50%). FIG. 12B is a diagram showing exemplary waveforms of the pulse signals that are input to the switching elements S1 to S4 and the output voltage V, in the case where each pulse signal has a duty ratio of 0.25 (25%). As shown in the figures, by varying the duty ratio, the output time rate (i.e., a proportion that a non-zero value period accounts for within 1 cycle) of the voltage V can be changed. As a result of this, the amplitude of the voltage of AC power which is received by the reception antenna 21 can be changed. Pulse signals with such varying duty ratios can be generated by using a PWM control circuit, for example. The duty ratio is to be adjusted within the range from 0% to 50%. When the duty ratio is 50%, the transmission voltage will have the largest amplitude; when the duty ratio is 0%, the transmission voltage will have the smallest amplitude. Such duty control is similarly applicable to a full bridge inverter circuit as shown in FIG. 9, too.

By the above methods, the control circuit 15 is able to adjust the level of the voltage of the AC power which is output from the inverter circuit 13. The control circuit 15 may control the output voltage by varying the drive frequency. Frequency control is applicable regardless of the type of the inverter circuit 13.

Figure 13:
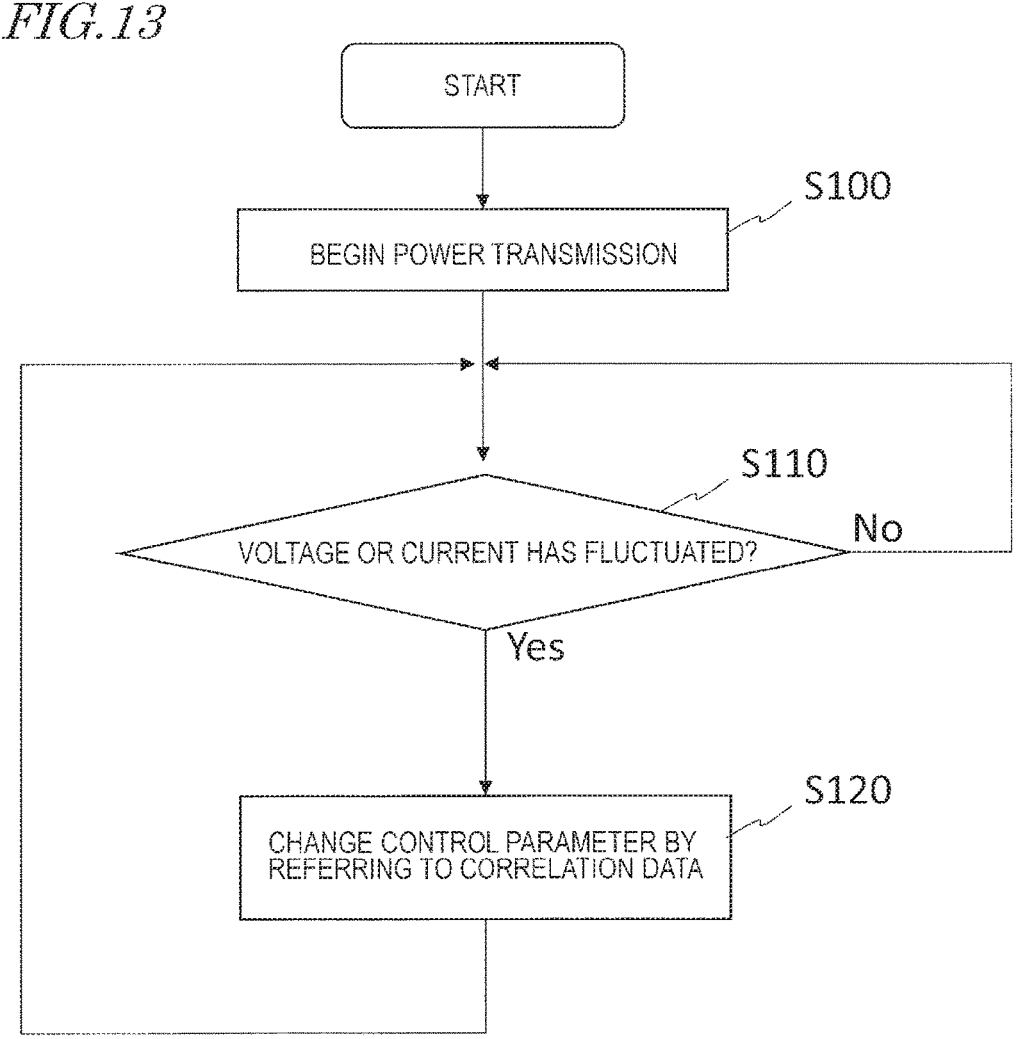
FIG. 13 is a flowchart showing the operation of a control circuit 15 in outline.

FIG. 13 is a flowchart showing the operation of the control circuit 15 in outline. At step S100, the control circuit 15 begins power transmission. At step S110, by referring to results of detection by the measurement device 16, the control circuit 15 determines whether at least one of voltage and current being input to the inverter circuit 13 has changed. In determining whether the voltage or current has changed or not, the control circuit 15 checks whether the measurement value of voltage or current has exceeded its respective threshold value, or whether a change rate over time of the measurement value of voltage or current has exceeded a predetermined threshold value. Upon determining that the voltage and current have not changed, the control circuit 15 maintains power transmission, and after the lapse of a certain period of time, again makes the determination of step S110. Upon detecting a change in the voltage or current, at step S120, the control circuit 15 refers to the correlation data stored in the memory 17 to alter the value of the control parameter to a value that corresponds to the measured voltage or current value. Note that, if a command to stop power transmission is received from a user or an external control device while performing the operation illustrated in FIG. 13, the power transmission control circuit 15 stops the operation of the inverter circuit 13.

Figure 14A:
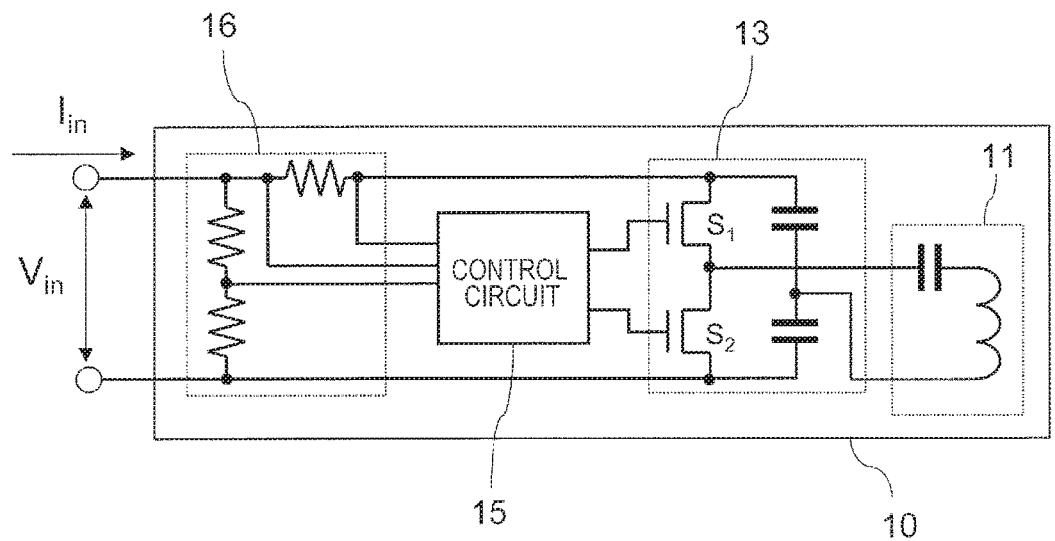
FIG. 14A is a diagram showing the construction of a power transmitter 10 according to an implementation example.

FIG. 14A is a diagram showing the construction of the power transmitter 10 according to an implementation example. The inverter circuit 13 of this implementation example has the circuit construction of a half bridge inverter. The measurement device 16 includes a plurality of resistors for measuring current and voltage. The measurement device 16 measures the DC voltage (referred to as "input voltage") $V_{in}$ and DC current (referred to as "input current") $I_{in}$ that are input to the power transmitter 10. In response to a fluctuation in the input voltage $V_{in}$ and input current $I_{in}$, the control circuit 15 changes the control parameter that defines the output voltage to the inverter circuit 13. Through this, the amplitude (or an effective value thereof) of the AC voltage that is sent out from the transmission antenna 11 is kept constant. The control parameter in this example is the drive frequency f. In advance, the memory 17 stores information indicating correspondence between the input current $I_{in}$ and input voltage $V_{in}$ and the drive frequency f.

Figure 14B:
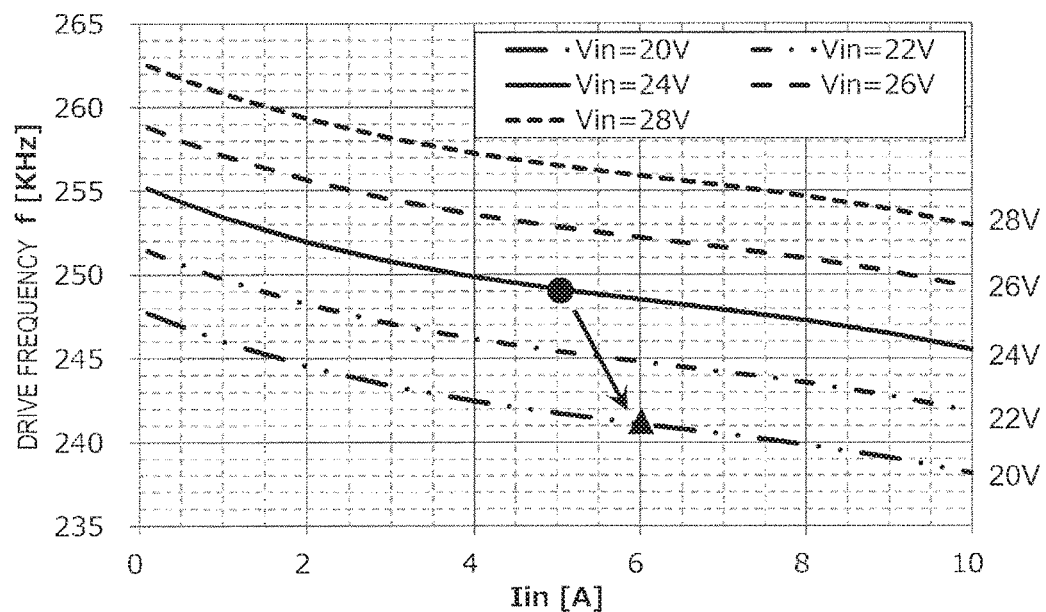
FIG. 14B is a diagram showing an exemplary correspondence between an input voltage $V_{in}$ and an input current $I_{in}$ and a drive frequency f of the inverter circuit 13.

FIG. 14B is a diagram showing an exemplary correspondence between an input voltage $V_{in}$ and an input current $I_{in}$ and a drive frequency f of the inverter circuit 13. Correlation data indicating this relationship, e.g., a look-up table, is stored in the memory 17. In this example, the control circuit 15 controls the drive frequency f so that the output voltage from the power receiver is maintained at 24 V.

As an initial condition, a case where $V_{in}$=24 V, $I_{in}$=5 A will be discussed. Based on the correspondence shown in FIG. 14B, the inverter circuit 13 has a drive frequency of 249 kHz under this initial condition (indicated by a circle in the figure). Next, the input voltage of the power transmitter 10 may change from $V_{in}$=24 V to $V_{in}$=20 V. In this case, the input current to the power transmitter 10 changes from $I_{in}$=5 A to $I_{in}$=6 A. Upon detecting this fluctuation, the control circuit 15 refers to the correlation data to alter the drive frequency of the inverter circuit 13 to 241 kHz (indicated by a triangle in the figure). As a result, even after the fluctuation, the output voltage from the power receiver can be maintained at 24 V. Thus, with each change in the input voltage or input current, the control circuit 15 adjusts the drive frequency of the inverter circuit 13 based on the correspondence shown in FIG. 14B.

Now, the amount of time required for the process of adjusting the drive frequency of the inverter circuit 13 based on values of input current and input voltage as monitored by the measurement device 16, and the time spans of load variations in the motor, which is a factor causing fluctuations in the output voltage, will be compared.

The current and voltage values to be measured by the measurement device 16 are analog values which are based on a voltage between electrodes of a resistor and a voltage divided by two resistors. These analog values are converted into digital values by an AD converter which may be included in the control circuit 15, for example.

The time constants of changes in the aforementioned analog values may be about 1 microsecond, assuming that the resistance values to be used are about 10 KΩ, and that there is a parasitic capacitance of about 100 pF between wiring lines.

In the case where the control circuit 15 is a microcontroller unit, for example, although depending on the type of microcontroller unit and the clock frequency, the time of conversion that is required by an AD converter is about 1 microsecond, for example. As one example, if analog values from four samples are to be converted through averaging into digital values, the time that elapses from the input of an analog values to its conversion into a digital value is about 4 microseconds.

If four samples of averaged digital values are to be treated as data of one input voltage value and one current value, the time required for this process is about 16 to 17 microseconds. Furthermore, let it be assumed that the processing time for calculating a drive frequency from a look-up table is 3 microsecond. In this case, beginning from a change occurring in the analog values, a value to which the control parameter is to be adjusted can be determined in about 20 microseconds.

Figure 7C:
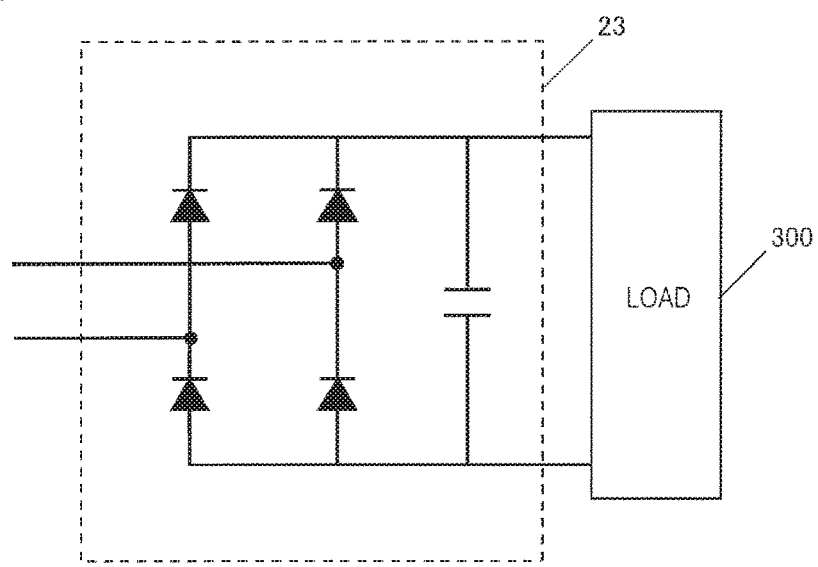
FIG. 7C is a block diagram showing an exemplary construction for a rectifier circuit 23.

Next, the time spans of load variations in the motor will be discussed. Even if the load variations in the motor present rapid changes, fluctuations in the output voltage from the power receiver 20 are suppressed when a smoothing capacitor is provided at the output section of the power receiver 20 as shown in FIG. 7C. For example, even when the load of the motor rapidly fluctuates every microsecond, for example, fluctuations in the output voltage can be suppressed so as to occur every several dozen microseconds to every several hundred microseconds.

Therefore, the amount of time that elapses from monitoring by the measurement device 16 to adjustment by the control circuit 15 is sufficiently small as compared to the time spans of load variations in the motor, which makes it possible to control the output voltage to be constant.

Figure 15A:
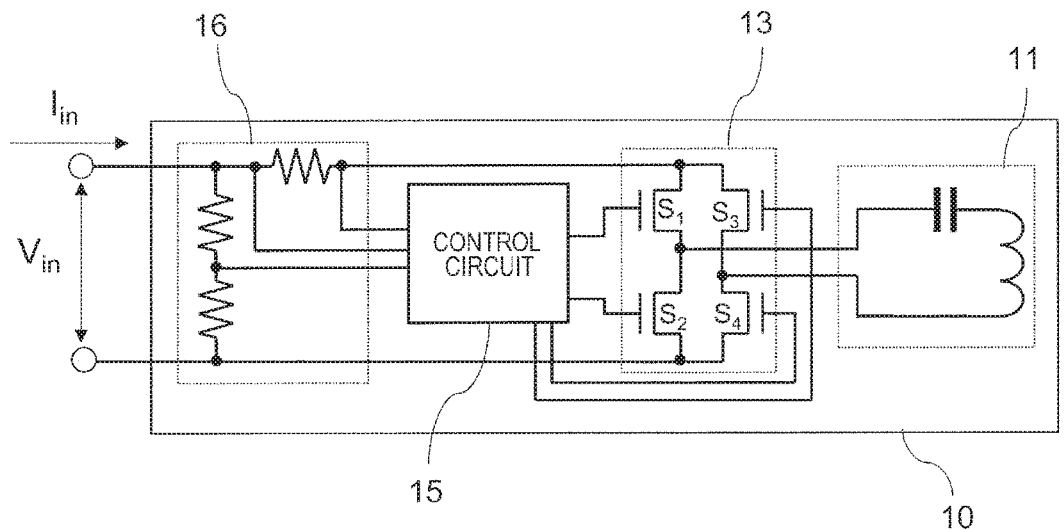
FIG. 15A is a diagram showing the construction of a power transmitter 10 according to another implementation example.

FIG. 15A is a diagram showing the construction of the power transmitter 10 according to another implementation example. The inverter circuit 13 of this implementation example has the circuit construction of a full bridge inverter. In response to a fluctuation in the input voltage $V_{in}$ and input current $I_{in}$, the control circuit 15 changes the phase shift amount between the pulse signals to be supplied to the four switching elements S1 to S4. Through this, the output voltage of the power receiver is kept constant. The control parameter in this example is the phase shift amount. In advance, the memory 17 stores correlation data indicating correspondence between the input current $I_{in}$ and input voltage $V_{in}$ and the phase shift amount φ.

Figure 15B:
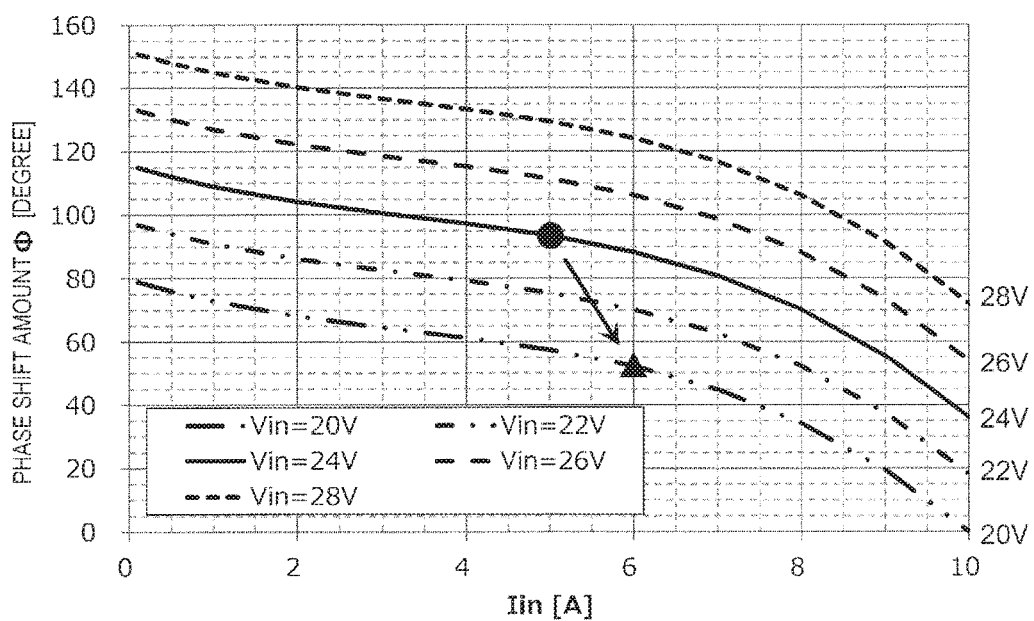
FIG. 15B is a diagram showing correspondence between the input voltage $V_{in}$ and input current $I_{in}$ and the phase shift amount (phase difference) φ.

FIG. 15B shows correspondence between the input voltage $V_{in}$ and input current $I_{in}$ and the phase shift amount (phase difference) φ. Correlation data indicating this relationship, e.g., a look-up table, is stored in the memory 17. In this example, the control circuit 15 controls the phase shift amount φ so that the output voltage from the power receiver is maintained at 24 V.

Also in this example, a case where $V_{in}$=24 V, $I_{in}$=5 A is assumed as an initial condition. Regardless of fluctuations, the drive frequency f is fixed at 249 kHz. Based on the correspondence shown in FIG. 15B, the inverter circuit 13 has a phase shift amount of 93.5 degrees under this initial condition (indicated by a circle in the figure). Next, the input voltage of the power transmitter 10 may change from $V_{in}$=24 V to $V_{in}$=20 V. In this case, the input current of the power transmitter 10 changes from $I_{in}$=5 A to $I_{in}$=6 A. Upon detecting this fluctuation, the control circuit 15 refers to the correlation data to alter the phase shift amount to 53.2 degrees (indicated by a triangle in the figure). As a result, even after the fluctuation, the output voltage from the power receiver can be maintained at 24 V. Thus, with each change in the input voltage or input current, the control circuit 15 adjusts the phase shift amount based on the correspondence shown in FIG. 15B. Note that not only the phase shift amount, but also the drive frequency may be controlled in order to attain finer control.

In the above example, the output voltage from the power receiver 20 (FIG. 6) is maintained at a constant value under control of the power transmitter 10. Control based on a similar concept is also applicable to the power receiver 20. For example, in a construction where the power receiver 20 includes a voltage conversion circuit such as a DC-DC converter following the rectifier circuit 23, the duty ratio of the switching elements (e.g., FETs) in the DC-DC converter may be controlled to maintain a constant output voltage. Such control may be performed by the control circuitry that is included in the power receiver 20.

Note that input rating information concerning a load to be connected to the power receiver may be stored in a storage medium such as a memory (e.g., a ROM or a RAM) or a register. Upon determining that a voltage, current, or power exceeding the rating has been supplied to the load, the control circuit 15 of the power transmitter 10 may stop power transmission from the inverter circuit 13. As a result, electric power exceeding the rating for the load can be prevented from being supplied, thereby avoiding destruction of the load.

Correspondences such as those shown in FIG. 14B and FIG. 15B are uniquely determined when the relative positioning between the transmission antenna 11 of the power transmitter 10 and the reception antenna 21 of the power receiver 20 is fixed. For example, if the transmission antenna 11 and the reception antenna 21 are fixed to a joint of the robot arm shown in FIG. 5, the aforementioned correspondence will not change.

In the above embodiment, this uniquely determined correspondence is previously recorded as a look-up table on a storage medium such as a memory. During the operation of power transmission, the control circuit 15 alters the control parameter, e.g., a drive frequency or a phase shift amount, in accordance with fluctuations in the input voltage and input current, on the basis of the look-up table. As a result, the output voltage from the power receiver 20 is controlled so as to be constant.

However, in actuality, the curve representing the actual correspondence may deviate from the intended curve, because of misalignments due to mounting tolerances of the transmission antenna 11 and the reception antenna 21 (e.g., deviations in the orientations of coil planes or the distance between coils), variations in the characteristics of the switching elements in the inverter circuit 13, or variations in the characteristics of resistors used in the measurement device 16.

Therefore, in order to enable appropriate control of the output voltage even when the aforementioned misalignments or variations in characteristics have occurred, the look-up table may be corrected.

The correction may be made when checking the finished product prior to shipment of the wireless power feeding unit, during a check after installation on a robot arm, etc., for example.

The correction may be performed in accordance with the following flow, for example.

Instead of the power source 200 as a supply source of input voltage to the power transmitter 10, a regulated power supply is connected. For example, a connector may be employed for establishing connection between the power source 200 and the power transmitter 10, such that the regulated power supply and the power transmitter 10 are allowed to become connected when performing correction.

Instead of the load 300 to which an output voltage from the power receiver 20 is applied, an electronic load is connected. As is the case in the power transmitter 10, a connector may be employed for establishing connection between the power receiver 20 and the load 300, such that the power receiver 20 and the electronic load are allowed to become connected when performing correction.

The output voltage from the regulated power supply (i.e., the input voltage to the power transmitter 10) is increased by every increment of 2 V, from 20 V to 28 V.

The input current to the electronic load (i.e., the output voltage from the power receiver 20) is increased by every 1 A, from 1 A to 10 A.

The drive frequency or phase shift amount is adjusted so that the output voltage equals 24 V under each condition, and the input voltage and the input current at that time are monitored with the measurement device 16; and a difference between the input voltage and input current at that time and the input voltage and input current on the look-up table is recorded as a correction value. Alternatively, the input voltage and input current values on the look-up table may be replaced by the input voltage and input current values at that time.

Through the above flow, correction values can be obtained for combinations of five voltage values and ten current values, totaling 50 points.

In order to reduce the time required for correction, the number of points of measurement may be decreased, and the correction values may be interpolated.

Conversely, for higher accuracy (i.e., better constancy of the output voltage), the voltage and currents may be measured at finer steps, thus resulting in a greater number of points.

Embodiment 2

Next, a wireless power transmission system according to Embodiment 2 of the present disclosure will be described.

A wireless power transmission system according to the present embodiment includes a plurality of wireless power feeding units and a plurality of loads. The plurality of wireless power feeding units are connected in series, and each supply electric power to one or more loads that is/are connected thereto. The control circuit of a power transmitter according to the present embodiment determines the value of the control parameter based not only on the voltage and current to be input to the associated inverter circuit, but also on the information of voltage and current to be output from a preceding power receiver, or the voltage and current to be input to a load to which electric power is supplied, in parallel to the power transmitter, from the preceding power receiver.

Figure 16:
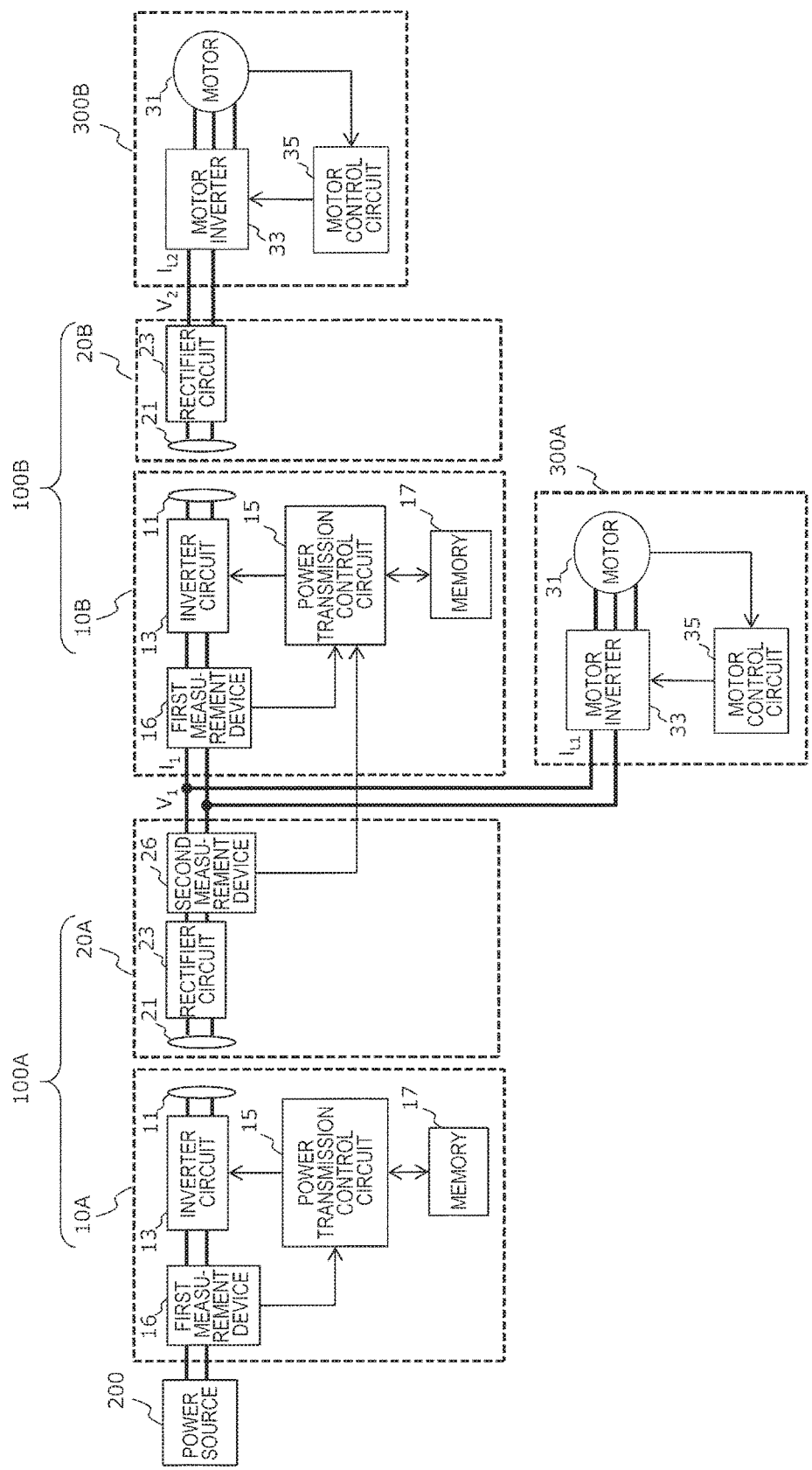
FIG. 16 is a block diagram showing the construction of a wireless power transmission system according to Embodiment 2.

FIG. 16 is a block diagram showing the construction of a wireless power transmission system according to the present embodiment. This wireless power transmission system includes two wireless power feeding units 100A and 100B and two loads 300A and 300B. The number of wireless power feeding units and the number of loads are not limited two, but may each be three or more.

Each power transmitter 10A, 10B is similar in construction to the power transmitter 10 of Embodiment 1. In the present embodiment, a measurement device in the power transmitter 10A, 10B is referred to as a first measurement device 16. The power receiver 20A includes a reception antenna 21 to electromagnetically couple with a transmission antenna 11 of the power transmitter 10A, a rectifier circuit 23, and a second measurement device 26. The second measurement device 26 measures voltage and current to be output from the rectifier circuit 23. The power receiver 20B is similar in construction to the power receiver 20 of Embodiment 1.

The loads 300A and 300B receive electric power supplied from the power receivers 20A and 20B, respectively. This construction is basically similar to the construction shown in FIG. 2. In the present embodiment, however, the power transmission control circuit 15 of the power transmitter 10B determines the value of the control parameter based not only on the values of voltage and current to be input to the associated inverter circuit 13, but also on the values of voltage and current to be output from its preceding rectifier circuit 23. As a result, even if the states of both loads 300A and 300B change simultaneously, the input voltage to the load 300B can be kept constant.

Generally speaking, the output impedance of the wireless power feeding unit is greater than the output impedance of a regulated power supply. Therefore, when the current that flows into a load (current consumption) changes due to a fluctuation in the load, a great change occurs in the voltage to be output from the wireless power transmission apparatus. For example, in the construction of FIG. 16, if the operation statuses of the loads 300A and 300B change so that the sum of the amounts of current to flow into the loads 300A and 300B changes, the output voltage from the first power receiver 20A changes in accordance with this change in the sum.

Supposing the power transmission control circuit 15 of the second power transmitter 10B performs power transmission control according to Embodiment 1, the control is able to cope with fluctuations in the second load 300B alone; however, it has been found that this control is prone to errors when the first load 300A fluctuates. This is because, even if the measurement value by the first measurement device 16 of the second power transmitter 10B may be the same, there is a difference in terms of actual input voltage to the inverter circuit 13, between when only the current consumption by the first load 300A fluctuates and when only the current consumption by the second load 300B fluctuates.

This is ascribable to a resistance component which actually exists due to wiring on the circuit board, in the path from the first measurement device 16 to the inverter circuit 13. When only the current consumption of the first load 300A fluctuates, no current fluctuation occurs in the path from the first measurement device 16 to the inverter circuit 13 (it is assumed that the output voltage from the first power receiver 20A is controlled to be constant). On the other hand, when only the current consumption of the second load 300B fluctuates, the current in the path from the first measurement device 16 to the inverter circuit 13 fluctuates. Therefore, the amount of voltage drop due to the resistance component between the first measurement device 16 and the inverter circuit 13 differs between the former case and the latter case.

Therefore, even if the measurement value by the first measurement device 16 may be the same, the actual input voltage to the inverter circuit 13 will differ between when the current consumption by the load 300A has changed and when the current consumption by the load 300B has changed. In order to perform more accurate power control, it is necessary to know how much (i.e., by what "rates") the respective changes in the power consumption by the loads 300A and 300B contribute to a change in the output voltage from the first power receiver 20A (i.e., the input voltage to the second power transmitter 10A). By appropriately correcting the control parameter value based on these rates, a constant voltage can keep being supplied to each load even if the operation statuses of both loads 300A and 300B simultaneously change.

In order to know the aforementioned rates, in addition to input monitoring by the first measurement device 16 of the power transmitter 10B, monitoring may be performed in one or more additional places. In the present embodiment, the second measurement device 26 is provided following the rectifier circuit 23 of the first power receiver 20A in order to know the aforementioned rates. Rather than in the first power receiver 20A, the second measurement device 26 may be provided in the first load 300A. By utilizing not only the voltage and current values measured by the first measurement device 16 but also those measured by the second measurement device 26, the power transmission control circuit 15 of the second power transmitter 10B sets the control parameter to an appropriate value.

Figure 17A:
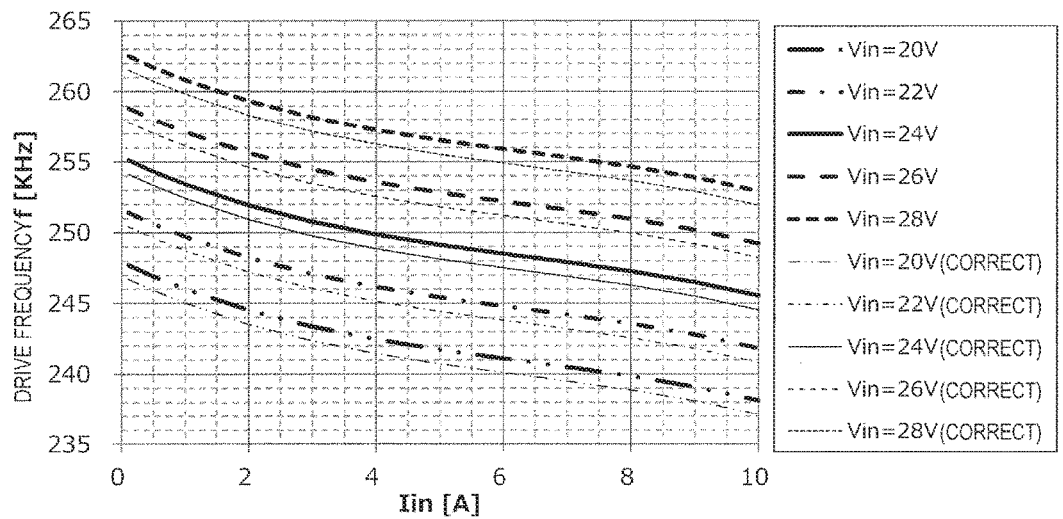
FIG. 17A is a diagram showing correspondence between: an input voltage $V_{in}$ (corresponding to the voltage $V_1$ in FIG. 16) and an input current $I_{in}$ (corresponding to the current $I_1$ in FIG. 16) to a second power transmitter 10B and the drive frequency f of the inverter circuit 13.
Figure 17B:
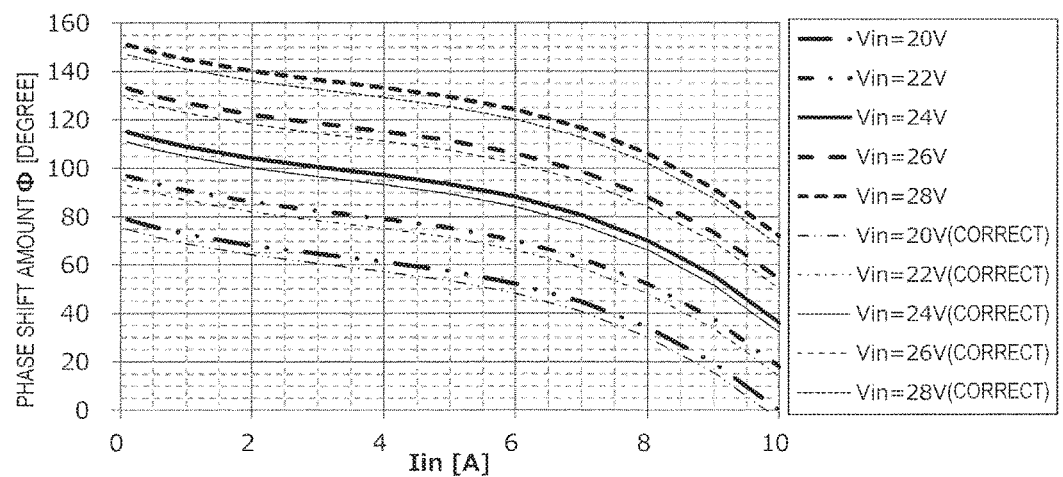
FIG. 17B is a diagram showing correspondence between: the input voltage $V_{in}$ and the input current $I_{in}$ to the second power transmitter 10B; and the phase shift amount φ between the pulse signals that are supplied to the plurality of switching elements in the inverter circuit 13 (full bridge inverter).

FIGS. 17A and 17B are diagrams for illustrating a method of determining the control parameter according to the present embodiment. FIG. 17A is a diagram showing correspondence between: an input voltage $V_{in}$ (corresponding to the voltage $V_1$ in FIG. 16) and an input current $I_{in}$ (corresponding to the current $I_1$ in FIG. 16) to the second power transmitter 10B and the drive frequency f of the inverter circuit 13. FIG. 17B is a diagram showing correspondence between: the input voltage $V_{in}$ and the input current $I_{in}$ to the second power transmitter 10B; and the phase shift amount φ between the pulse signals that are supplied to the plurality of switching elements in the inverter circuit 13 (full bridge inverter). In these examples, the output voltage from each power receiver is controlled to be maintained at 24 V. Five thick lines in FIGS. 17A and 17B represent values of the control parameter (see FIG. 14B and FIG. 15B) as determined by the method of Embodiment 1. Five thin lines in FIGS. 17A and 17B represent examples of the control parameter as corrected according to the present embodiment.

FIG. 17A shows an example of correcting the drive frequency in the case where the current $I_{L1}$ flowing in the first load 300A has increased from that in the example shown in FIG. 14B. When the current $I_{L1}$ increases, the drive frequency is corrected in a manner of decreasing. This is in order to suppress the decrease in the output voltage $V_2$ of the second power receiver 20B that is caused by a decrease in the voltage $V_1$, which in turn is caused by an increase in $I_{L1}$. On the other hand, when the current $I_{L1}$ decreases, the drive frequency is corrected in a manner of increasing. This is in order to suppress the increase in the output voltage $V_2$ of the power receiver 20B that is caused by an increase in voltage $V_1$, which in turn is caused by a decrease in $I_{L1}$. The amount of correction can be calculated based on a rate between the monitored current $I_1$ by the first measurement device 16 of the second power transmitter 10B and the input current $I_{L1}$ to the first load 300A (which is a difference between the monitored current by the second measurement device 26 of the first power receiver 20A and the monitored current $I_1$ by the first measurement device 16).

FIG. 17B shows an example of correcting the phase shift amount φ in the case where the current $I_{L1}$ flowing in the first load 300A has increased from that in the example shown in FIG. 15B. When the current $I_{L1}$ increases, the phase shaft amount φ is corrected in a manner of decreasing. This is in order to suppress the decrease in the output voltage $V_2$ of the power receiver 20B that is caused by a decrease in the voltage $V_1$, which in turn is caused by an increase in $I_{L1}$. On the other hand, when the current $I_{L1}$ decreases, the phase shift amount φ is corrected in a manner of increasing. This is in order to suppress the increase in the output voltage $V_2$ of the power receiver 20B that is caused by an increase in the voltage $V_1$, which in turn is caused by a decrease in $I_{L1}$. The amount of correction can be calculated based on a rate between the monitored current $I_1$ by the first measurement device 16 of the second power transmitter 10B and the input current $I_{L1}$ to the first load 300A (which is a difference between the monitored current by the second measurement device 26 of the first power receiver 20A and the monitored current $I_1$ by the first measurement device 16).

In advance, the memory 17 of the second power transmitter 10B stores correlation data defining correspondence between control parameter values and combinations of measurement values of voltage and current to be measured by the first measurement device 16 and measurement values of voltage and current to be measured by the second measurement device 26. By referring to this correlation data, the control circuit 15 of the second power transmitter 10B is able to determine the control parameter value based on the measurement value by the first measurement device 16 and the measurement value by the second measurement device 26. Alternatively, the memory 17 may store correlation data which is similar to the correlation data in Embodiment 1. In that case, the control circuit 15 may first refer to that correlation data in order to determine a control parameter value on a preliminary basis, and thereafter correct this control parameter value based on the measurement value by the second measurement device 26.

With the above construction, even when the loads 300A and 300B simultaneously fluctuate, the voltage to be input to the load 300B can be maintained constant.

Next, variants of the present embodiment will be described.

Figure 18:
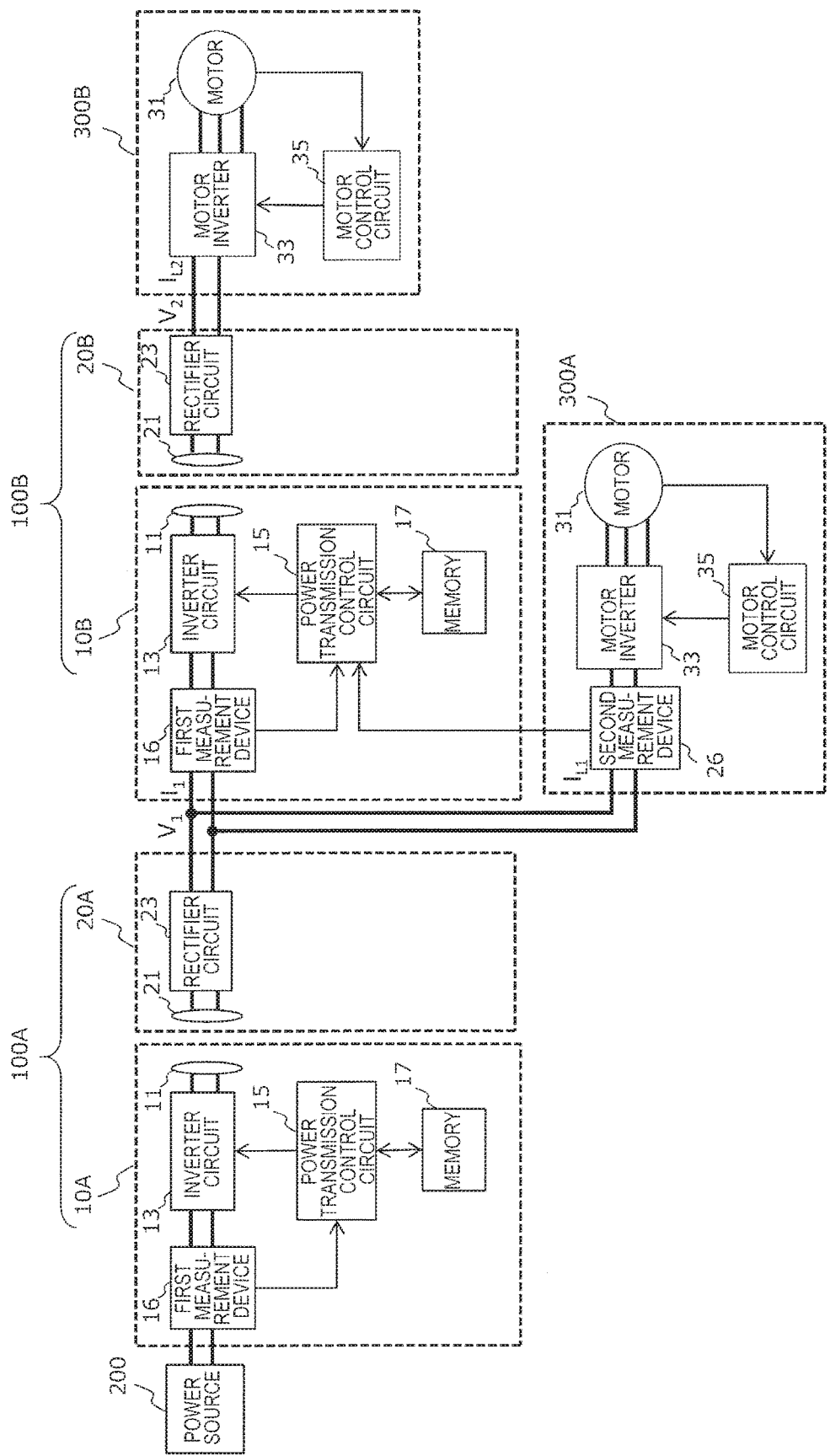
FIG. 18 is a block diagram showing a variant of Embodiment 2.

FIG. 18 is a block diagram showing a variant of the present embodiment. In this example, the second measurement device 26 is provided in the first load 300A, rather than in the first power receiver 20A. A result of measurement by the second measurement device 26 is transmitted to the power transmission control circuit 15 in a wired or wireless manner. Such a construction also allows the control parameter value to be corrected based on a rate between $I_1$ and $I_{L1}$.

Figure 19A:
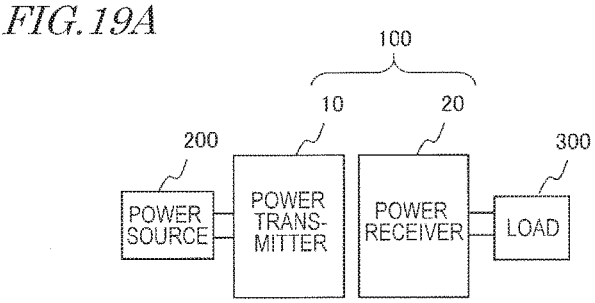
FIG. 19A shows a wireless power transmission system which includes one wireless power feeding unit 100.
Figure 19B:
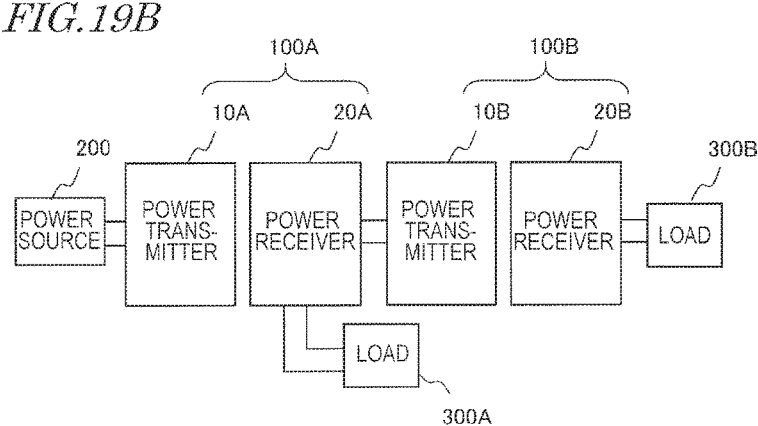
FIG. 19B shows a wireless power transmission system in which two wireless power feeding units 100A and 100B are provided between a power source 200 and a terminal load 300B.
Figure 19C:
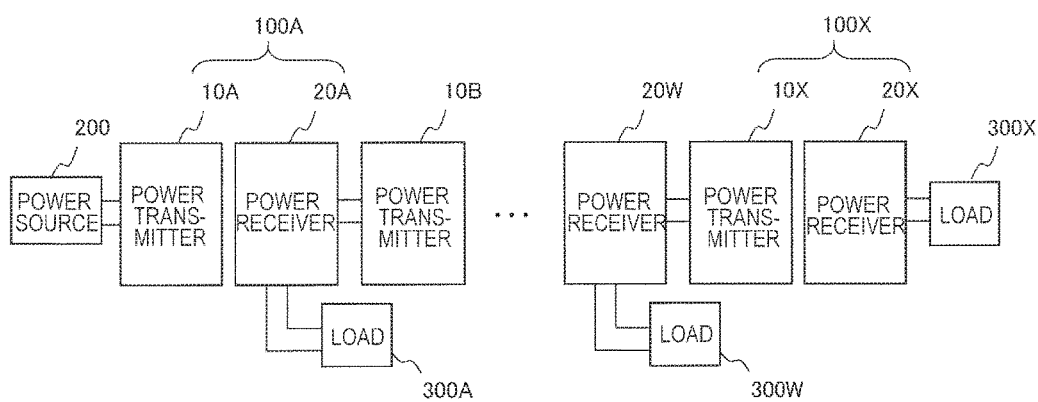
FIG. 19C shows a wireless power transmission system in which three or more wireless power feeding units 100A through 100X are provided between a power source 200 and a terminal load device 300X.

FIGS. 19A through 19C are schematic diagrams showing different constructions for the wireless power transmission system according to the present disclosure. FIG. 19A shows a wireless power transmission system which includes one wireless power feeding unit 100. FIG. 19B shows a wireless power transmission system in which two wireless power feeding units 100A and 100B are provided between a power source 200 and a terminal load 300B. FIG. 19C shows a wireless power transmission system in which three or more wireless power feeding units 100A through 100X are provided between a power source 200 and a terminal load device 300X. The technique according to the present disclosure is applicable to any of the implementations of FIGS. 19A, 19B, and 19C. The construction shown in FIG. 19C is suitably applicable to an electrically operated apparatus such as a robot having many movable sections, as has been described with reference to FIG. 5, for example.

In the construction of FIG. 19C, the above-described control may be exerted in all of the wireless power feeding units 100A through 100X, or only in some of the wireless power feeding units. For example, if the load 300X in FIG. 19C will undergo such small load variations that the aforementioned control to maintain the output voltage in a predetermined range is unnecessary, then the power transmitter 10X of the wireless power feeding unit 100X does not need to perform the control based on the input voltage and input current to the inverter circuit.

As described above, the present disclosure encompasses power transmitters as recited in the following Items.

[Item 1]

A power transmitter to wirelessly transmit electric power to a power receiver that includes a reception antenna, the power transmitter comprising:

an inverter circuit which converts input DC power into AC power and outputs the AC power;

a transmission antenna which is connected to the inverter circuit, and which sends out the AC power having been output from the inverter circuit; and a control circuit which, based on measurement values of voltage and current to be input to the inverter circuit, determines a value of a control parameter defining an output voltage from the inverter circuit and controls the inverter circuit by using the determined value of the control parameter, wherein, when at least one of the measurement values of voltage and current to be input to the inverter circuit changes, the control circuit changes the value of the control parameter based on the measurement values of voltage and current so that a voltage to be output from the power receiving circuit is maintained within a predetermined range.

[Item 2]

The power transmitter of item 1, further comprising a memory storing correlation data representing correspondence between values of voltage and current to be input to the inverter circuit and values of the control parameter, wherein, by referring to the correlation data, the control circuit determines a value of the control parameter from the measurement values of voltage and current to be input to the inverter circuit.

[Item 3]

The power transmitter of item 1 or 2, wherein the control parameter is a drive frequency of the inverter circuit.

[Item 4]

The power transmitter of item 1 or 2, wherein, the inverter circuit includes four switching elements;

the four switching elements includes a first switching element pair and a second switching element pair;

in a conducting state, the first switching element pair allows a voltage of a same polarity as the voltage being input to the inverter circuit to be supplied to the transmission antenna;

in a conducting state, the second switching element pair allows a voltage of an opposite polarity from the voltage being input to the inverter circuit to be supplied to the transmission antenna;

the control circuit supplies a pulse signal to each of the four switching elements that determines a state of conduction/non-conduction thereof, and controls the output voltage from the inverter circuit by adjusting a phase difference between two pulse signals that are supplied to the first switching element pair and a phase difference between two pulse signals that are supplied to the second switching element pair; and the phase differences define the control parameter.

[Item 5]

The power transmitter of item 1 or 2, wherein, the inverter circuit includes a plurality of switching elements;

the control circuit supplies a pulse signal to each of the plurality of switching elements that determines a state of conduction/non-conduction thereof, and controls the output voltage from the inverter circuit by adjusting a duty ratio of the pulse signals; and the duty ratio defines the control parameter.

[Item 6]

The power transmitter of any of items 1 to 5, wherein, the power transmitter is a second power transmitter in a wireless power transmission system which includes:

a first power transmitter;

a first power receiver to wirelessly receive electric power from the first power transmitter;

a first load to receive electric power in a wired manner from the first power receiver;

a second power transmitter to receive electric power in a wired manner from the first power receiver;

a second power receiver to wirelessly receive electric power from the second power transmitter; and a second load to receive electric power in a wired manner from the second power receiver.

[Item 7]

The power transmitter of item 6, wherein the control circuit determines the value of the control parameter based not only on the measurement values of voltage and current to be input to the inverter circuit but also on measurement values of voltage and current to be output from the first power receiver or measurement values of voltage and current to be input to the first load.

[Item 8]

The power transmitter of item 7, further comprising a memory storing first correlation data representing correspondence between values of the control parameter and combinations of values of voltage and current to be input to the inverter circuit and values of voltage and current to be output from the first power receiver, or second correlation data representing correspondence between values of the control parameter and combinations of values of voltage and current to be input to the inverter circuit and values of voltage and current to be input to the first load, wherein, by referring to the correlation data, the control circuit determines a value of the control parameter.

[Item 9]

A wireless power transmission system comprising the power transmitter of any of items 1 to 5; and the power receiver.

[Item 10]

A wireless power transmission system comprising:

the power transmitter of any of items 6 to 8; and the first power receiver.

[Item 11]

A wireless power transmission system comprising:

the power transmitter of any of items 6 to 8; and the second power receiver.

[Item 12]

The wireless power transmission system of item 10, comprising:

the power transmitter of any of items 7 to 9;

the first power transmitter;

the first power receiver; and the second power receiver.

[Item 13]

The wireless power transmission system of item 12, further comprising:

the first load; and the second load.

The technique according to the present disclosure is suitably applicable to an electrically operated apparatus such as a robot, a monitor camera, an electric vehicle, or a multicopter to be used in a factory or a site of engineering work, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended items to cover all modifications of the invention that fall within the true spirit and scope of the invention.

This application is based on Japanese Patent Applications No. 2017-004108 filed Jan. 13, 2017, and No. 2017-236939 filed Dec. 11, 2017, the entire contents of which are hereby incorporated by reference.

What is claimed is:

1. A power transmitter to wirelessly transmit electric power to a power receiver that includes a reception antenna, the power transmitter comprising:
   an inverter circuit which converts input DC power into AC power and outputs the AC power;
   a transmission antenna which is connected to the inverter circuit, and which sends out the AC power having been output from the inverter circuit; and
   a control circuit which, based on measurement values of voltage and current to be input to the inverter circuit, determines a value of a control parameter defining an output voltage from the inverter circuit and controls the inverter circuit by using the determined value of the control parameter, wherein,
   when at least one of the measurement values of voltage and current to be input to the inverter circuit changes, the control circuit changes the value of the control parameter based on the measurement values of voltage and current so that a voltage to be output from the power receiving circuit is maintained within a predetermined range.

2. The power transmitter of claim 1, further comprising a memory storing correlation data representing correspondence between values of voltage and current to be input to the inverter circuit and values of the control parameter, wherein,
   by referring to the correlation data, the control circuit determines a value of the control parameter from the measurement values of voltage and current to be input to the inverter circuit.

3. The power transmitter of claim 1, wherein the control parameter is a drive frequency of the inverter circuit.

4. The power transmitter of claim 1, wherein,
   the inverter circuit includes four switching elements;
   the four switching elements includes a first switching element pair and a second switching element pair;
   in a conducting state, the first switching element pair allows a voltage of a same polarity as the voltage being input to the inverter circuit to be supplied to the transmission antenna;
   in a conducting state, the second switching element pair allows a voltage of an opposite polarity from the voltage being input to the inverter circuit to be supplied to the transmission antenna;
   the control circuit supplies a pulse signal to each of the four switching elements that determines a state of conduction/non-conduction thereof, and controls the output voltage from the inverter circuit by adjusting a phase difference between two pulse signals that are supplied to the first switching element pair and a phase difference between two pulse signals that are supplied to the second switching element pair; and
   the phase differences define the control parameter.

5. The power transmitter of claim 1, wherein,
   the inverter circuit includes a plurality of switching elements;
   the control circuit supplies a pulse signal to each of the plurality of switching elements that determines a state of conduction/non-conduction thereof, and controls the output voltage from the inverter circuit by adjusting a duty ratio of the pulse signals; and
   the duty ratio defines the control parameter.

6. The power transmitter of claim 1, wherein,
   the power transmitter is a second power transmitter in a wireless power transmission system which includes:
   a first power transmitter;
   a first power receiver to wirelessly receive electric power from the first power transmitter;
   a first load to receive electric power in a wired manner from the first power receiver;
   a second power transmitter to receive electric power in a wired manner from the first power receiver;
   a second power receiver to wirelessly receive electric power from the second power transmitter; and
   a second load to receive electric power in a wired manner from the second power receiver.

7. The power transmitter of claim 6, wherein the control circuit determines the value of the control parameter based not only on the measurement values of voltage and current to be input to the inverter circuit but also on measurement values of voltage and current to be output from the first power receiver or measurement values of voltage and current to be input to the first load.

8. The power transmitter of claim 7, further comprising
   a memory storing first correlation data representing correspondence between values of the control parameter and combinations of values of voltage and current to be input to the inverter circuit and values of voltage and current to be output from the first power receiver, or second correlation data representing correspondence between values of the control parameter and combinations of values of voltage and current to be input to the inverter circuit and values of voltage and current to be input to the first load, wherein,
   by referring to the correlation data, the control circuit determines a value of the control parameter.

9. A wireless power transmission system comprising the power transmitter of claim 1; and the power receiver.

10. A wireless power transmission system comprising:
    the power transmitter of claim 6; and
    the first power receiver.

11. A wireless power transmission system comprising:
    the power transmitter of claim 6; and
    the second power receiver.

12. The wireless power transmission system of claim 10, comprising:
    the power transmitter of claim 7;
    the first power transmitter;
    the first power receiver; and
    the second power receiver.

13. The wireless power transmission system of claim 12, further comprising:
    the first load; and
    the second load.

* * * * *